United States Patent
Kurasawa et al.

(10) Patent No.: US 8,968,935 B2
(45) Date of Patent: Mar. 3, 2015

(54) ANODE FOR LITHIUM ION SECONDARY BATTERY, LITHIUM ION SECONDARY BATTERY, ELECTRIC TOOL, BATTERY CAR, AND ELECTRIC POWER STORAGE SYSTEM

(75) Inventors: Shunsuke Kurasawa, Fukushima (JP); Kenichi Kawase, Fukushima (JP); Takashi Fujinaga, Fukushima (JP)

(73) Assignee: Sony Corporation, Tokyo (JP)

( * ) Notice: Subject to any disclaimer, the term of this patent is extended or adjusted under 35 U.S.C. 154(b) by 581 days.

(21) Appl. No.: 13/016,494

(22) Filed: Jan. 28, 2011

(65) Prior Publication Data

US 2012/0040242 A1 Feb. 16, 2012

(30) Foreign Application Priority Data

Feb. 5, 2010 (JP) ................ P2010-024582

(51) Int. Cl.
| | |
|---|---|
| H01M 4/58 | (2010.01) |
| H01M 4/13 | (2010.01) |
| H01M 4/02 | (2006.01) |
| H01M 4/38 | (2006.01) |
| H01M 4/04 | (2006.01) |
| H01M 4/134 | (2010.01) |
| H01M 4/36 | (2006.01) |
| H01M 10/052 | (2010.01) |

(52) U.S. Cl.
CPC ............ *H01M 4/386* (2013.01); *H01M 4/0421* (2013.01); *H01M 4/134* (2013.01); *H01M 4/366* (2013.01); *H01M 10/052* (2013.01); *H01M 2300/0025* (2013.01); *Y02E 60/122* (2013.01); *Y02T 10/7011* (2013.01)
USPC ................ 429/231.95; 429/211; 429/218.1

(58) Field of Classification Search
None
See application file for complete search history.

(56) References Cited

U.S. PATENT DOCUMENTS

| | | | |
|---|---|---|---|
| 2008/0206651 A1* | 8/2008 | Kawase et al. ............... | 429/330 |
| 2010/0119948 A1* | 5/2010 | Hasegawa et al. ....... | 429/231.95 |

FOREIGN PATENT DOCUMENTS

| | | |
|---|---|---|
| JP | 2000-036323 | 2/2000 |
| JP | 2001-273892 | 10/2001 |
| JP | 2002-289177 | 10/2002 |
| JP | 2004-349162 | 12/2004 |
| JP | 2004349162 A * | 12/2004 |
| JP | 2007-317419 | 12/2007 |
| WO | WO 2008139682 A1 * | 11/2008 |

* cited by examiner

*Primary Examiner* — Ula C. Ruddock
*Assistant Examiner* — Daniel Gatewood
(74) *Attorney, Agent, or Firm* — K&L Gates LLP

(57) ABSTRACT

A lithium ion secondary battery having more superior cycle characteristics is provided. The lithium ion secondary battery includes a cathode, an anode, and an electrolyte. The anode has an anode active material layer in which a first layer containing silicon as an anode active material, and a second layer containing silicon and a metal element as an anode active material are alternately layered on an anode current collector. At least one of a lamellar oxide-containing region and a lamellar nitrogen-containing region is inserted in at least one of the first layer and the second layer.

16 Claims, 12 Drawing Sheets

ANODE FOR LITHIUM ION SECONDARY BATTERY, LITHIUM ION SECONDARY BATTERY, ELECTRIC TOOL, BATTERY CAR, AND ELECTRIC POWER STORAGE SYSTEM

CROSS REFERENCES TO RELATED APPLICATIONS

The present application claims priority to Japanese Patent Application No. JP 2010-024582 filed on Feb. 5, 2010, the entire contents of which are being incorporated herein by reference

BACKGROUND

The present disclosure relates to an anode for a lithium ion secondary battery that contains an anode active material containing silicon (Si) as an element, a lithium ion secondary battery including the same, an electric tool using the lithium ion secondary battery, a battery car using the lithium ion secondary battery, and an electric power storage system using the lithium ion secondary battery.

In recent years, portable electronic devices such as camera-integrated VTR (videotape recorders), mobile phones, and notebook personal computers have been widely used, and it is strongly demanded to reduce their size and weight and to achieve their long life. Accordingly, as a power source for the portable electronic devices, a battery, in particular a light-weight secondary battery capable of providing a high energy density has been developed. In recent years, it has been considered to apply such a secondary battery not only to the small electronic devices but also to a large electronic device represented by a battery car or the like.

Specially, a secondary battery using insertion and extraction of lithium for charge and discharge reaction (so-called lithium ion secondary battery) is extremely prospective, since such a secondary battery is able to provide a higher energy density compared to a lead battery and a nickel cadmium battery.

The lithium ion secondary battery includes an anode having a structure in which an anode active material layer containing an anode active material is provided on an anode current collector. As the anode active material, a carbon material has been widely used. However, in recent years, as the high performance and the multi functions of the portable electronic devices are developed, further improvement of the battery capacity is demanded. Thus, it has been considered to use silicon instead of the carbon material. Since the theoretical capacity of silicon (4199 mAh/g) is significantly higher than the theoretical capacity of graphite (372 mAh/g), it is expected that the battery capacity is thereby highly improved.

However, in the case where the anode active material layer is formed by depositing silicon as an anode active material by vapor-phase deposition method, the binding characteristics are not sufficient. Thus, if charge and discharge are repeated, there is a possibility that the anode active material layer is intensely expanded and shrunk to be pulverized. If the anode active material layer is pulverized, depending on the pulverization degree, an irreversible lithium oxide is excessively formed resulting from increase of the surface area, and current collectivity is lowered resulting from dropping from the anode current collector. Accordingly, the cycle characteristics as important characteristics of the secondary battery are lowered.

Therefore, to improve the cycle characteristics even when silicon is used as the anode active material, various devices have been invented. Specifically, the technique to form the anode active material layer as a multilayer structure by depositing silicon several times in vapor-phase deposition method has been disclosed (for example, see Japanese Unexamined Patent Application Publication No. 2007-317419). In addition, the technique to cover the surface of the anode active material with a metal such as iron, cobalt, nickel, zinc, and copper (for example, see Japanese Unexamined Patent Application Publication No. 2000-036323), the technique to diffuse a metal element such as copper not being alloyed with lithium in an anode active material (for example, see Japanese Unexamined Patent Application Publication No. 2001-273892), the technique to form a solid solution of copper in an anode active material (for example, see Japanese Unexamined Patent Application Publication No. 2002-289177) and the like have been proposed. In addition, the applicant has disclosed the technique that a multilayer structure in which the first layer and the second layer both containing silicon and each having different oxygen content are alternately layered is provided, and thereby intense expansion and shrinkage of the anode active material layer are inhibited and structural breakage is inhibited (for example, see Japanese Unexamined Patent Application Publication No. 2004-349162).

SUMMARY

The recent portable electronic devices increasingly tend to become small, and the high performance and the multifunctions thereof tend to be increasingly developed. Accordingly, there is a tendency that charge and discharge of the secondary battery are frequently repeated, and thus the cycle characteristics are easily lowered. In particular, in the lithium ion secondary battery in which silicon is used as an anode active material to attain a high capacity, the cycle characteristics are easily lowered significantly, being influenced by pulverization of the anode active material layer at the time of the foregoing charge and discharge. Thus, further improvement of the cycle characteristics of the secondary battery is aspired.

In view of the foregoing disadvantage, in the present embodiments, it is desirable to provide an anode for a lithium ion secondary battery capable of improving the cycle characteristics, a lithium ion secondary battery using the same, an electric tool using the foregoing lithium ion secondary battery, a battery car using the foregoing lithium ion secondary battery, and an electric power storage system using the foregoing lithium ion secondary battery.

According to an embodiment, there is provided an anode for a lithium ion secondary battery including an anode active material layer in which a first layer containing silicon as an anode active material and a second layer containing silicon and a metal element as an anode active material are alternately layered on an anode current collector. At least one of a lamellar oxide-containing region and a lamellar nitrogen-containing region is inserted in at least one of the first layer and the second layer. According to an embodiment, there is provided a lithium ion secondary battery including a cathode, the anode for a lithium ion secondary battery of the embodiment, and an electrolyte. Further, according to an embodiment, there are provided an electric tool, a battery car, and an electric power storage system using the lithium ion secondary battery as a power source or an electric power storage source.

The anode for a lithium ion secondary battery, the lithium ion secondary battery, the electric tool, the battery car, and the electric power storage system of the embodiments, as a laminated structure composing the anode active material layer, the structure in which the first layer containing silicon and the second layer containing silicon and a metal element are alternately layered, and at least one of the lamellar oxide-containing region and the lamellar nitrogen-containing region is inserted in at least one of the two types of layers is adopted. Thereby, stress associated with expansion and shrinkage at the time of charge and discharge in the anode active material layer is relaxed.

According to the anode for a lithium ion secondary battery of the embodiment, the first layer and the second layer containing respectively different content ratios of metal element are alternately layered, and at least one of the lamellar oxide-containing region and the lamellar nitrogen-containing region is inserted in at least one of the first layer and the second layer, and thereby the anode active material layer is structured. Thus, structural breakage of the anode active material layer is inhibited, contact characteristics between each layer in the laminated structure, contact characteristics between the anode active material layer and the anode current collector, and current collectivity are improved. Therefore, in the case where the anode for a lithium ion secondary battery is applied to the lithium ion secondary battery, while a high capacity is realized by using silicon as an anode active material, superior cycle characteristics are also able to be obtained. Further, according to the electric tool, the battery car, and the electric power storage system of the embodiments, since the lithium ion secondary battery with superior cycle characteristics is used, longer time usage is enabled.

Additional features and advantages are described herein, and will be apparent from the following Detailed Description and the figures.

DETAILED DESCRIPTION

Embodiments will be hereinafter described in detail with reference to the drawings. The description will be given in the following order.

Figure 1:
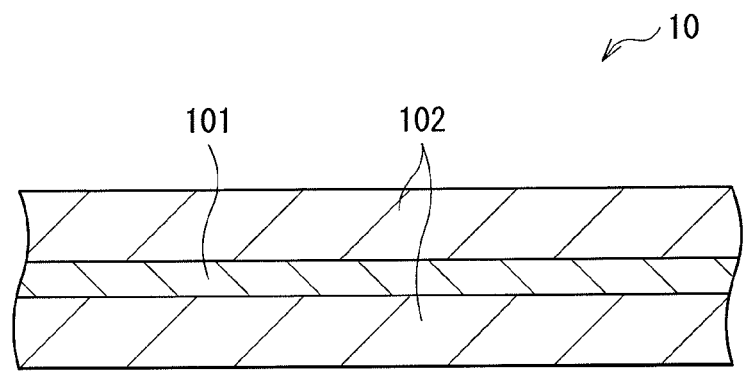
FIG. 1 is a schematic cross sectional view illustrating an anode for a lithium ion secondary battery as a first embodiment.

1. First embodiment (anode: example that an anode active material layer is not particulate)
2. Second embodiment (anode: example that an anode active material layer is particulate)
3. Third embodiment (example of a first secondary battery to a third secondary battery including the foregoing anodes)
3-1. First secondary battery (cylindrical type)
3-2. Second secondary battery (laminated film type)
3-3. Third secondary battery (square type)
4. Application of a lithium ion secondary battery
1. First Embodiment
Structure of an Anode FIG. 1 illustrates a schematic cross sectional structure of an anode for a lithium ion secondary battery as a first embodiment (hereinafter simply referred to as "anode") 10. The anode 10 is used for an electrochemical device such as a battery. The anode has, for example, a structure in which an anode active material layer 102 is provided on a surface of an anode current collector 101. The anode active material layer 102 may be provided on both faces of the anode current collector 101 as illustrated in FIG. 1, or may be provided only on a single face of the anode current collector 101.

The anode current collector 101 is preferably made of a metal material having favorable electrochemical stability, favorable electric conductivity, and favorable mechanical strength. Examples of the metal materials include copper (Cu), nickel (Ni), and stainless steel. Specially, copper is preferable as the metal material, since a high electric conductivity is able to be thereby obtained.

In particular, the metal material composing the anode current collector 101 preferably contains one or more metal elements not forming an intermetallic oxide with an electrode reactant. If the intermetallic oxide is formed with the electrode reactant, lowering of the current collectivity characteristics and separation of the anode active material layer 102 from the anode current collector 101 easily occur, since the anode current collector 101 is broken by being affected by a stress due to expansion and shrinkage of the anode active material layer 102 at the time of charge and discharge. Examples of the metal elements include copper, nickel, titanium (Ti), iron (Fe), and chromium (Cr).

Further, the foregoing metal material preferably contains one or more metal elements being alloyed with the anode active material layer 102. Thereby, the contact characteristics between the anode current collector 101 and the anode active material layer 102 are improved, and thus the anode active material layer 102 is hardly separated from the anode current collector 101. For example, in the case that the anode active material of the anode active material layer 102 contains silicon (Si), examples of metal elements that do not form an intermetallic oxide with the electrode reactant and are alloyed with the anode active material layer 102 include copper, nickel, and iron. These metal elements are preferable in terms of the strength and the electric conductivity as well.

The anode current collector 101 may have a single layer structure or a multilayer structure. In the case where the anode current collector 101 has the multilayer structure, for example, it is preferable that the layer adjacent to the anode active material layer 102 is made of a metal material being alloyed with the anode active material layer 102, and layers not adjacent to the anode active material layer 102 are made of other metal material.

The surface of the anode current collector 101 is preferably roughened. Thereby, due to the so-called anchor effect, the contact characteristics between the anode current collector 101 and the anode active material layer 102 are improved. In this case, it is enough that at least the surface of the anode current collector 101 opposed to the anode active material layer 102 is roughened. Examples of roughening methods include a method of forming fine particles by electrolytic treatment. The electrolytic treatment is a method of providing concavity and convexity by forming fine particles on the surface of the anode current collector 101 by electrolytic method in an electrolytic bath. A copper foil provided with the electrolytic treatment is generally called "electrolytic copper foil."

Ten point height of roughness profile Rz of the surface of the anode current collector 101 is, for example, preferably from 1.5 μm to 6.5 μm both inclusive, since thereby the contact characteristics between the anode current collector 101 and the anode active material layer 102 are further improved.

Figure 2:
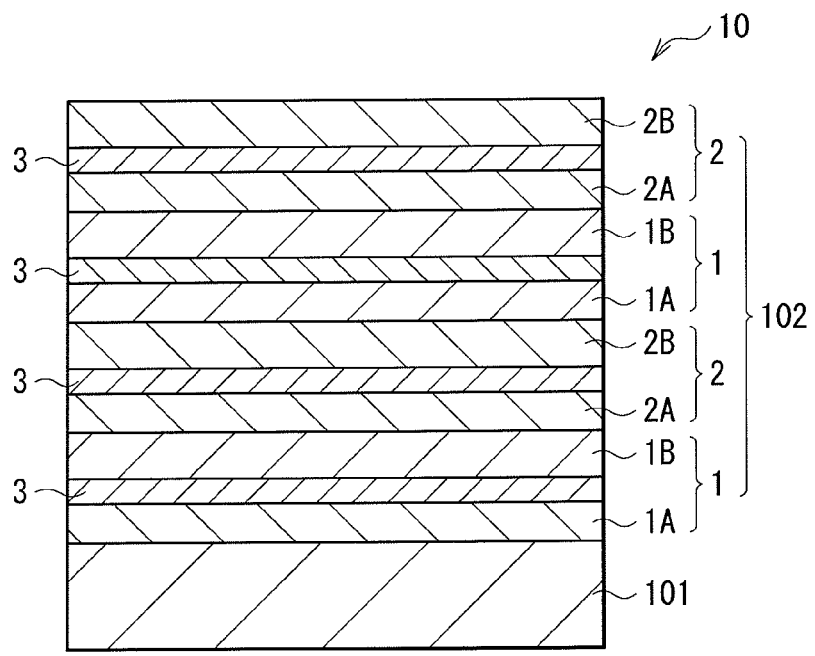
FIG. 2 is a cross sectional view illustrating a detailed structure of the anode active material layer illustrated in FIG. 1.

FIG. 2 illustrates a detailed cross sectional structure of the anode active material layer 102. As illustrated in FIG. 2, the anode active material layer 102 has a multilayer structure composed of a first layer 1 containing an anode active material having silicon (Si) as an element and a second layer 2 containing an anode active material having silicon and a metal element X as an element. In the multilayer structure, the first layer 1 and the second layer 2 are alternately layered on the anode current collector 101. The thickness of the first layer 1 and the thickness of the second layer 2 are desirably, for example, from 50 nm to 5000 nm both inclusive, and are more desirably from 100 nm to 1000 nm both inclusive. Further, the metal element X structuring the anode active material in the second layer 2 has, for example, at least one of nickel, cobalt, iron, manganese (Mn), chromium, titanium, aluminum (Al), magnesium (Mg), and molybdenum (Mo). In the second layer 2, the atomic ratio of the metal element X to silicon is preferably 0.01 to 1 both inclusive. The thickness of the first layer 1 may be equal to the thickness of the second layer 2, or the thickness of the first layer 1 may be different from the thickness of the second layer 2. FIG. 2 exemplifies the structure in which the first layer 1 and the second layer 2 are alternately layered sequentially from the anode current collector 101 side. However, in this embodiment, a structure having the opposite order, that is, a structure in which the second layer 2 and the first layer 1 are alternately layered from the anode current collector 101 side may be adopted. Further, the number of the first layer 1 and the number of the second layer 2 included in the laminated structure are not limited to those illustrated in FIG. 2.

Existence of the metal element X in the anode active material contributes to inhibition of expansion and shrinkage of the anode active material layer 102. In particular, by alternately layering the second layer 2 containing the metal element X as an anode active material and the first layer 1 not containing the metal element X as an anode active material, expansion and shrinkage of the anode active material layer 102 are further inhibited.

An insertion layer 3 is inserted in both the first layer 1 and the second layer 2. That is, the insertion layer 3 inserted in the first layer 1 divides the first layer 1 into a region 1A and a region 1B, and the insertion layer 3 inserted in the second layer 2 divides the second layer 2 into a region 2A and a region 2B. FIG. 2 illustrates an example in which the insertion layer 3 is arranged in the center in the thickness direction of the first layer 1 or the second layer 2 (that is, the region 1A and the region 1B have the same thickness and the region 2A and the region 2B have the same thickness), but the arrangement thereof is not limited thereto. Further, the anode active material layer 102 may contain a binder, an electrical conductor or the like according to needs in addition to the anode active material.

The insertion layer 3 is an oxygen-containing region in which the anode active material has oxygen (O) or a nitrogen-containing region in which the anode active material has nitrogen (N), which is a region having a higher oxygen content ratio or a higher nitrogen content ratio than that in the other regions in the anode active material layer 102. Otherwise, the insertion layer 3 is an oxygen and nitrogen-containing region in which the anode active material has both oxygen and nitrogen, which is a region having a higher oxygen content ratio and a higher nitrogen content ratio than those in the other regions in the anode active material layer 102. It is possible that regions other than the insertion layer 3 has oxygen and nitrogen, or do not have oxygen and nitrogen. Oxygen and nitrogen contained in the insertion layer 3 exists as a silicon compound or a compound of the metal element X. The thickness of the insertion layer 3 is desirably, for example, from 2 nm to 100 nm both inclusive, and is more desirably from 20 nm to 50 nm both inclusive. Due to existence of the insertion layer 3, expansion and shrinkage of the anode active material layer 102 are further inhibited. The composition of the insertion layer 3 in the first layer 1 may be identical with the composition of the insertion layer 3 in the second layer 2, or the composition of the insertion layer 3 in the first layer 1 may be different from the composition of the insertion layer 3 in the second layer 2. Further, in the insertion layer 3, the oxygen existence ratio to silicon (O/Si) or the nitrogen existence ratio to silicon (N/Si) is desirably from 0.01 to 0.5 both inclusive based on atomic ratio.

Silicon as an element of the anode active material has a high ability to insert and extract lithium as an electrode reactant, and thereby a high energy density is able to be thereby obtained.

In the second layer 2, silicon may be contained in the anode active material in the form of simple substance, an alloy, or a compound. Otherwise, the anode active material may have one or more phases of simple substance, an alloy, or a compound of silicon at least in part. Such a material may be used singly, or a plurality thereof may be used by mixture. In the embodiment, "the alloy" includes an alloy containing one or more metal elements and one or more metalloid elements, in addition to an alloy composed of two or more metal elements. The alloy in this embodiment may contain a nonmetallic element. The texture thereof includes a solid solution, a eutectic crystal (eutectic mixture), an intermetallic compound, and a texture in which two or more thereof coexist.

Examples of alloys of silicon include an alloy containing at least one selected from the group consisting of tin (Sn), copper, zinc (Zn), indium (In), silver (Ag), germanium (Ge), bismuth (Bi), antimony (Sb), arsenic (As), and calcium (Ca) in addition to nickel, cobalt, iron, manganese, chromium, titanium, aluminum, magnesium, and molybdenum described above as the metal element X as an element other than silicon. In particular, by adding an appropriate amount of iron, cobalt, nickel, germanium, tin, arsenic, zinc, copper, titanium, chromium, magnesium, calcium, aluminum, or silver as other element to the anode active material, energy density is possibly further improved than in the anode active material composed of silicon simple substance. In the case where the foregoing other element with which energy density is possibly improved is contained at the ratio of, for example, from 1.0 atomic% (at%) to 40 atomic% both inclusive out of the anode active material, contribution to improvement of the discharge capacity retention ratio as a secondary battery is clearly shown.

Examples of compounds of silicon include a compound having carbon (C) as an element other than silicon. The compound of silicon may contain, for example, one or a plurality of the foregoing other elements as an element other than silicon.

The anode active material layer 102 is formed by, for example, using coating method, vapor-phase deposition method, liquid-phase deposition method, spraying method, firing method, or a combination of two or more of these methods. In particular, the anode active material layer 102 is preferably formed through a plurality of deposition steps by using vapor-phase deposition method, and the anode active material layer 102 and the anode current collector 101 are preferably alloyed in at least part of the interface thereof. Specifically, at the interface thereof, the element of the anode current collector 101 may be diffused in the anode active material layer 102; or the element of the anode active material layer 102 may be diffused in the anode current collector 101; or these elements may be diffused in each other. Thereby, breakage of the anode active material layer 102 due to expansion and shrinkage at the time of charge and discharge hardly occurs, and the electron conductivity between the anode current collector 101 and the anode active material layer 102 is improved.

The metal element X is able to be taken in the anode active material by using an evaporation source in which the metal element X is mixed or by using multiple evaporation sources in depositing the anode active material by using evaporation method as vapor-phase deposition method, for example. It is able to form the second layer 2 having a desirable composition ratio by using two evaporation sources with each different composition ratio between silicon and the metal element X, or by changing the evaporation amount from each element evaporation source in the case of using the multiple evaporation sources.

For example, the insulation layer 3 is able to be formed by introducing oxygen gas or nitrogen gas into a chamber intermittently at the time when the anode active material is deposited by using vapor-phase deposition method. It is needless to say that in the case where a desired oxygen content ratio or a desired nitrogen content ratio is not able to be obtained only by introducing oxygen gas or nitrogen gas, liquid (for example, moisture vapor or the like) may be introduced in the chamber.

It is possible that the oxygen content ratio and the nitrogen content ratio of the insertion layer 3 are clearly different from those of the other regions, or the oxygen content ratio and the nitrogen content ratio of the insertion layer 3 are not clearly different from those of the other regions. That is, in the case where the introduction amount of the foregoing oxygen gas and the foregoing nitrogen gas is continuously changed, the oxygen content ratio or the nitrogen content ratio may be continuously changed. In this case, the insertion layer 3 is in a "lamellar" state rather than in a "layer" state, and the oxygen content ratio or the nitrogen content ratio is distributed while high values of the oxygen content ratio or the nitrogen content ratio and low values of the oxygen content ratio or the nitrogen content ratio are alternately repeated in the thickness direction in the anode active material layer 102.

Examples of vapor-phase deposition method include physical deposition method and chemical deposition method. More specific examples include vacuum evaporation method, sputtering method, ion plating method, laser ablation method, thermal CVD (Chemical Vapor Deposition) method, plasma CVD method, and spraying method. As liquid-phase deposition method, a known technique such as electric plating and electroless plating is able to be used. Firing method is, for example, a method in which a particulate anode active material mixed with a binder or the like is dispersed in a solvent and the anode current collector is coated with the resultant, and heat treatment is subsequently provided at temperature higher than the melting point of the binder or the like. Examples of firing method include a known technique such as atmosphere firing method, reactive firing method, and hot press firing method.

The anode active material layer 102 has a multilayer structure, and thereby internal stress of the anode active material layer resulting from expansion and shrinkage of the anode active material at the time of charge and discharge is more easily relaxed. Further, in the case where the deposition step of the anode active material layer 102 is divided into a plurality of times (the first layer 1 and the second layer 2 are sequentially formed and layered) in forming the anode active material layer 102 by using evaporation method or the like associated with high heat at the time of forming a film, the following advantage is obtained. That is, compared to a case that the anode active material layer 102 having a single layer structure is formed in one time deposition treatment, time that the anode current collector 101 is exposed at high heat is able to be shortened, and thermal damage to the anode current collector 101 is able to be decreased.

Manufacturing Method of the Anode

The anode 10 is manufactured, for example, by the following procedure. Specifically, first, the anode current collector 101 is prepared, and the surface of the anode current collector 101 is provided with roughening treatment according to needs. After that, the first layer 1 and the second layer 2 containing the foregoing anode active material and the insertion layer 3 are sequentially deposited a plurality of times on the surface of the anode current collector 101 by using the foregoing method such as vapor-phase deposition method to form the anode active material layer 102 having a multilayer structure. If vapor-phase deposition method is used, the anode active material may be deposited while the anode current collector 101 is fixed, or the anode active material may be deposited while the anode current collector 101 is rotated.

Operation and Effect of this Embodiment

As described above, according to the anode 10 of this embodiment, in the anode active material layer 102, the first layer 1 containing silicon as an anode active material and the second layer 2 containing silicon and the metal element X as an anode active material are alternately layered, and the insertion layer 3 is inserted in the first layer 1 and the second layer 2. Thus, stress resulting from expansion and shrinkage at the time of charge and discharge in the anode active material layer 102 is relaxed. Therefore, structural breakage of the anode active material layer 102 is inhibited, contact characteristics between each layer in the laminated structure, contact characteristics between the anode active material layer 102 and the anode current collector 101, and current collectivity are improved. Therefore, in the case where the anode 10 is applied to an electrochemical device such as a secondary battery, while a high capacity is realized by using silicon as an anode active material, superior cycle characteristics are also able to be obtained.

First and Second Modified Examples

Figure 3A:
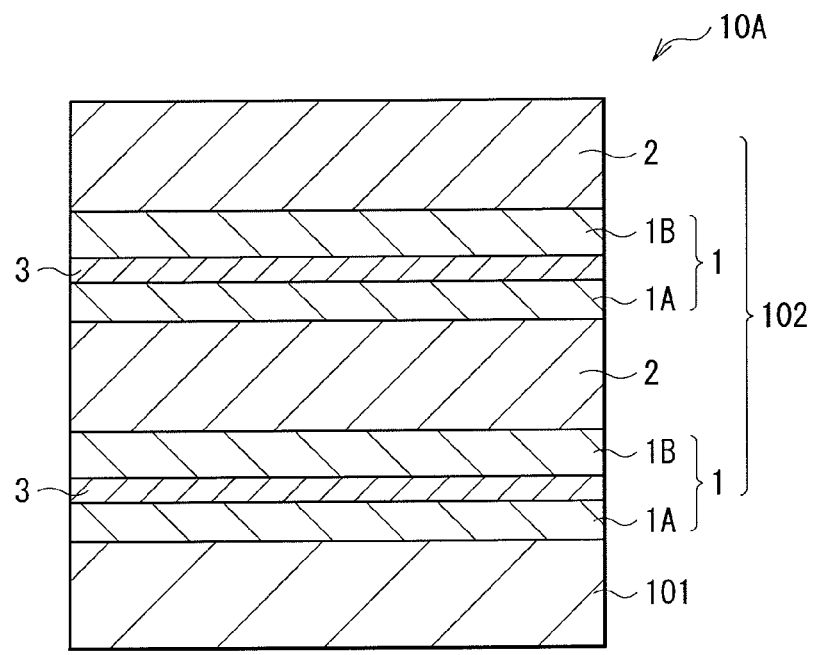
FIGS. 3A and 3B are cross sectional views illustrating a modified example of the anode for a lithium ion secondary battery illustrated in FIG. 1.
Figure 3B:
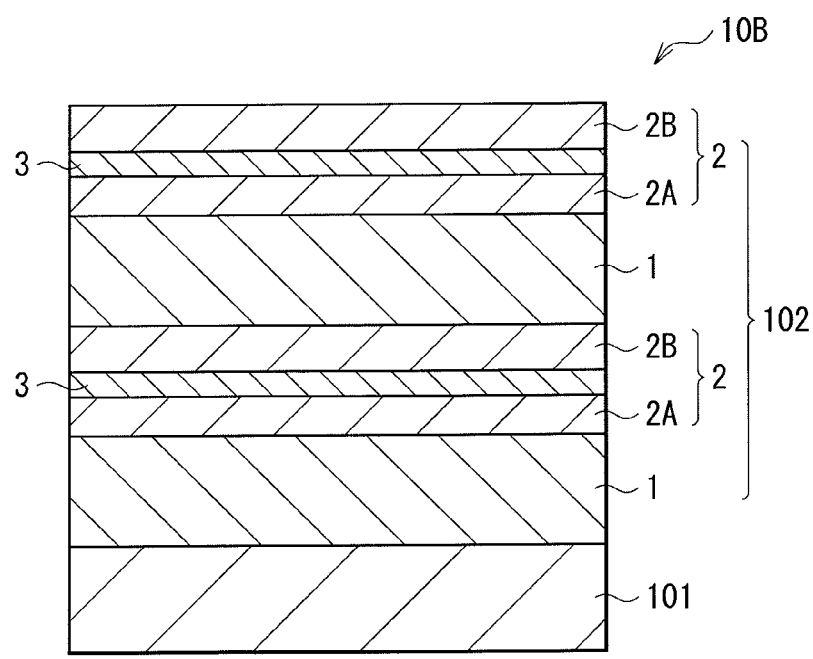

Next, a description will be given of the first and the second modified examples in the anode of the foregoing first embodiment with reference to FIG. 3A. FIG. 3A illustrates a detailed cross sectional structure of an anode 10A as the first modified example, and FIG. 3B illustrates a detailed cross sectional structure of an anode 10B as the second modified example.

In the anode 10 of the foregoing first embodiment, both the first layer 1 and the second layer 2 include the insertion layer 3. Meanwhile, as illustrated in the anodes 10A and 10B illustrated in FIG. 3A or FIG. 3B, the insertion layer 3 may be provided for only one of the first layer 1 and the second layer 2.

2. Second Embodiment
Structure of an Anode

Figure 4:
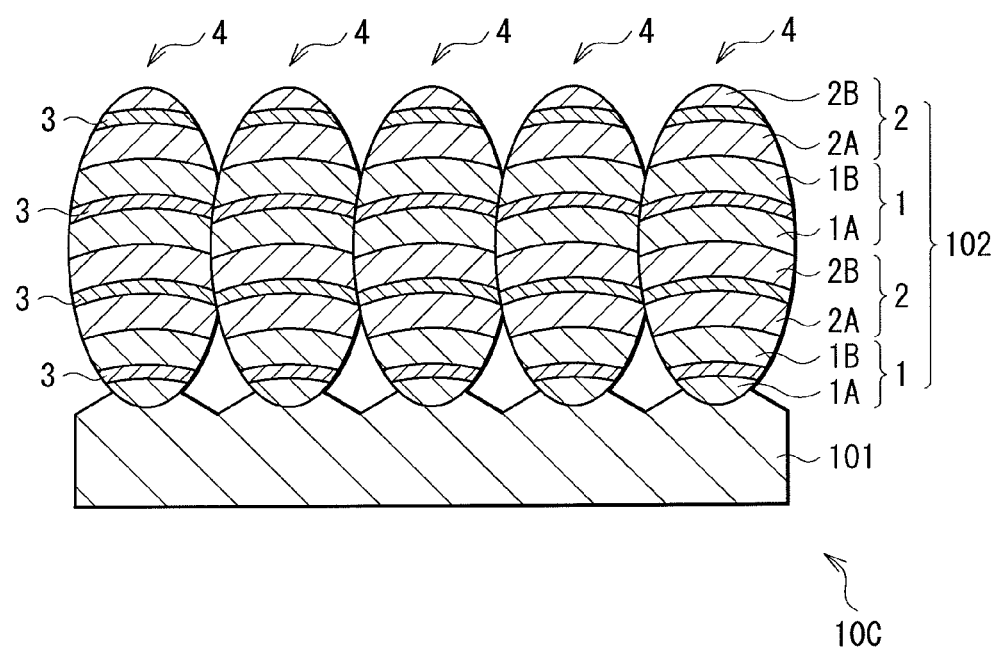
FIG. 4 is a schematic cross sectional view illustrating an anode for a lithium ion secondary battery as a second embodiment.

FIG. 4 schematically illustrates a cross sectional structure of a main section of an anode 10C as a second embodiment. The anode 10C is used for a lithium ion secondary battery as the anode 10 of the foregoing first embodiment is. In the following description, structures, operations, and effects of the elements substantially identical with those of the foregoing anode 10 will be omitted.

As illustrated in FIG. 4, the anode 10C has a structure in which an anode active material layer 102A containing a plurality of anode active material particles 4 is provided on the anode current collector 101. The respective anode active material particles 4 have a multilayer structure in which the first layer 1 and the second layer 2 composed of an anode active material similar to that of the first embodiment are layered. The multilayer structure extends in the thickness direction of the anode active material layer 102A so that the multilayer structure stands on the anode current collector 101. The insertion layer 3 is provided for the first layer 1 and the second layer 2. The insertion layer 3 may be inserted for only one of the first layer 1 and the second layer 2. Further, the anode active material layer 102A may be provided on both faces of the anode current collector 101 as in the foregoing first embodiment, or may be provided on only one face thereof.

Manufacturing method of the Anode

The anode active material particles 4 are formed by, for example, one of vapor-phase deposition method, liquid-phase deposition method, spraying method, and firing method, or two or more methods thereof as in the foregoing first embodiment. In particular, vapor-phase deposition method is preferably used, since thereby the anode current collector 101 and the anode active material particles 4 are easily alloyed in the interface thereof. Alloying may be made by diffusing an element of the anode current collector 101 into the anode active material particles 4; or vice versa. Otherwise, alloying may be made by diffusion of the element of the anode current collector 101 and silicon as an element of the anode active material particles 4 into each other. Due to such alloying, structural breakage of the anode active material particles 4 resulting from expansion and shrinkage at the time of charge and discharge is inhibited, and the electric conductivity between the anode current collector 101 and the anode active material particles 4 is improved.

Operation and Effect of this Embodiment

As described above, in this embodiment, the anode active material particles 4 structuring the anode active material layer 102A provided on the anode current collector 101 are formed as the laminated structure composed of the first layer 1 and the second layer 2, and the first layer 1 and the second layer 2 respectively contain the insertion layer 3. Thereby, stress generated by expansion and shrinkage at the time of charge and discharge in the anode active material layer 102A is relaxed. Therefore, structural breakage of the anode active material layer 102A is inhibited, contact characteristics between each layer in the laminated structure, contact characteristics between the anode active material layer 102A and the anode current collector 101, and current collectivity are improved. Therefore, effect similar to that of the foregoing first embodiment is obtained.

3. Third Embodiment

Next, a description will be given of usage examples of the anodes 10 and 10A to 10C described in the foregoing first embodiment and the foregoing second embodiment. A description will be given, as an example, taking a first secondary battery to a third secondary battery as a lithium ion secondary battery for which the anodes 10 and 10A to 10C are used.

3-1. First Secondary Battery (Cylindrical Type)

Figure 5:
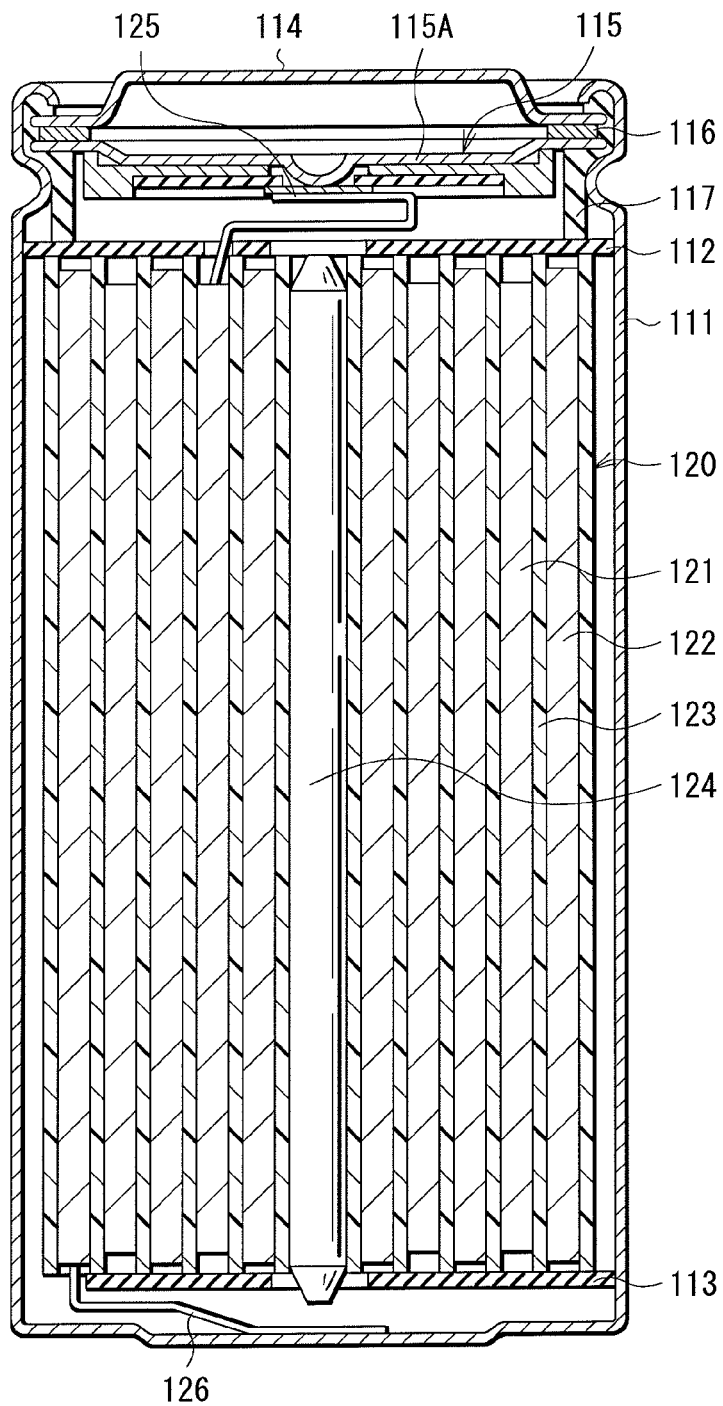
FIG. 5 is a cross sectional view illustrating a structure of a first secondary battery using the anode for a lithium ion secondary battery of the embodiment.
Figure 6:
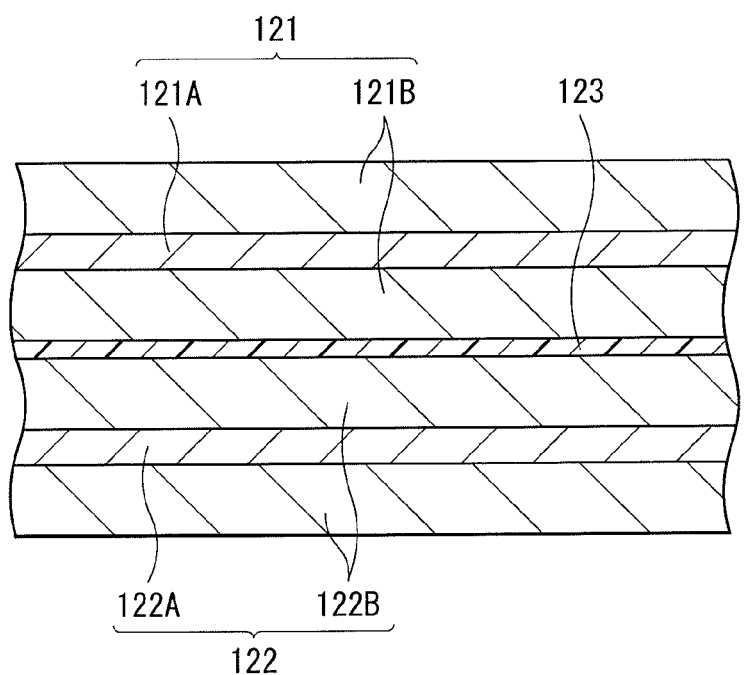
FIG. 6 is a cross sectional view illustrating an enlarged part of the spirally wound electrode body illustrated in FIG. 5.

FIG. 5 and FIG. 6 illustrate a cross sectional structure of a first secondary battery. FIG. 6 illustrates an enlarged part of a spirally wound electrode body 120 illustrated in FIG. 5. The secondary battery herein described is, for example, a lithium ion secondary battery in which, for example, a capacity of an anode 122 is expressed based on insertion and extraction of lithium.

Whole Structure of the First Secondary Battery

The secondary battery mainly contains the spirally wound electrode body 120 in which a cathode 121 and the anode 122 are layered with a separator 123 in between and spirally wound, and a pair of insulating plates 112 and 113 inside a battery can 111 in the shape of an approximately hollow cylinder. The battery structure including the battery can 111 is a so-called cylindrical type.

The battery can 111 is made of, for example, a metal material such as iron, aluminum, or an alloy thereof. One end of the battery can 111 is closed, and the other end of the battery can 111 is opened. The pair of insulating plates 112 and 113 is arranged to sandwich the spirally wound electrode body 120 in between and to extend perpendicularly to the spirally wound periphery face.

At the open end of the battery can 111, a battery cover 114, and a safety valve mechanism 115 and a PTC (Positive Temperature Coefficient) device 116 provided inside the battery cover 114 are attached by being caulked with a gasket 117. Inside of the battery can 111 is thereby hermetically sealed. The battery cover 114 is made of, for example, a material similar to that of the battery can 111. The safety valve mechanism 115 is electrically connected to the battery cover 114 through the PTC device 116. In the safety valve mechanism 115, in the case where the internal pressure becomes a certain level or more by internal short circuit, external heating or the like, a disk plate 115A flips to cut the electric connection between the battery cover 114 and the spirally wound electrode body 120. As temperature rises, the PTC device 116 increases the resistance and thereby limits a current to prevent abnormal heat generation resulting from a large current. The gasket 117 is made of, for example, an insulating material. The surface of the gasket 117 is coated with asphalt.

A center pin 124 may be inserted in the center of the spirally wound electrode body 120. In the spirally wound electrode body 120, a cathode lead 125 made of a metal material such as aluminum is connected to the cathode 121, and an anode lead 126 made of a metal material such as nickel is connected to the anode 122. The cathode lead 125 is electrically connected to the battery cover 114 by being welded to the safety valve mechanism 115. The anode lead 126 is welded and thereby electrically connected to the battery can 111.

Cathode

The cathode 121 has a structure in which, for example, a cathode active material layer 121B is provided on both faces of a cathode current collector 121A having a pair of faces. The cathode current collector 121A is made of a metal material such as aluminum, nickel, and stainless steel. The cathode active material layer 121B contains a cathode active material, and may contain other material such as a binder and an electrical conductor according to needs.

The cathode active material contains one or more cathode materials capable of inserting and extracting lithium as an electrode reactant. As the cathode material, for example, a lithium-containing compound is preferable, since thereby a high energy density is able to be obtained. Examples of the lithium-containing compound include a composite oxide containing lithium and a transition metal element and a phosphate compound containing lithium and a transition metal element. Specially, a compound containing at least one selected from the group consisting of cobalt, nickel, manganese, and iron as a transition metal element is preferable, since thereby a higher voltage is able to be obtained. The chemical formula thereof is expressed by, for example, $Li_xM1O_2$ or $Li_yM2PO_4$. In the formula, M1 and M2 represent one or more transition metal elements. Values of x and y vary according to the charge and discharge state of the secondary battery, and are generally in the range of $0.05 \leq x \leq 1.10$ and $0.05 \leq y \leq 1.10$.

Examples of composite oxides containing lithium and a transition metal element include a lithium cobalt composite oxide ($Li_xCoO_2$), a lithium nickel composite oxide ($Li_xNiO_2$), a lithium nickel cobalt composite oxide ($Li_xNi_{(1-z)}Co_zO_2$ (z<1)), a lithium nickel cobalt manganese composite oxide ($Li_xNi_{(1-v-w)}Co_vMn_wO_2$ (v+w<1)), and lithium manganese composite oxide having a spinel structure ($LiMn_2O_4$). Specially, a composite oxide containing cobalt is preferable, since thereby a high capacity is obtained and superior cycle characteristics are obtained. Further, examples of phosphate compounds containing lithium and a transition metal element include lithium iron phosphate compound ($LiFePO_4$) and a lithium iron manganese phosphate compound ($LiFe_{(1-u)}M_uPO_4$ (u<1)).

In addition, examples of cathode materials include an oxide, a disulfide, a chalcogenide, and a conductive polymer. Examples of oxides include titanium oxide, vanadium oxide, and manganese dioxide. Examples of disulfides include titanium disulfide and molybdenum sulfide. Examples of chalcogenide include niobium selenide. Examples of conductive polymers include sulfur, polyaniline and polythiophene.

It is needless to say that the cathode material may be a material other than the foregoing compounds. Further, two or more of the foregoing cathode materials may be used by mixture arbitrarily.

Examples of cathode binders include a synthetic rubber such as styrene-butadiene rubber, fluorine system rubber, and ethylene propylenediene, and a polymer material such as polyvinylidene fluoride. One thereof may be used singly, or a plurality thereof may be used by mixture.

Examples of cathode electrical conductors include a carbon material such as graphite, carbon black, acetylene black, and Ketjen black. One thereof may be used singly, or a plurality thereof may be used by mixture. The cathode electrical conductor may be a metal material, a conductive polymer or the like as long as the material has electric conductivity.

Anode

The anode 122 has a structure similar to those of the foregoing anode 10, 10A, 10B, or 10C. For example, in the anode 122, an anode active material layer 122B is provided on both faces of an anode current collector 122A having a pair of faces. The structures of the anode current collector 122A and the anode active material layer 122B are respectively similar to the structures of the anode current collector 101 and the anode active material layer 102 in the foregoing anode. In the anode 122, the chargeable capacity of the anode material capable of inserting and extracting lithium is preferably larger than the chargeable capacity of the cathode 121. Thereby, at the time of full charge, there is low possibility that lithium is precipitated as dendrite on the anode 122.

Separator

The separator 123 separates the cathode 121 from the anode 122, and passes lithium ions while preventing current short circuit due to contact of both electrodes. The separator 123 is made of, for example, a porous film composed of a synthetic resin such as polytetrafluoroethylene, polypropylene, and polyethylene, or a ceramics porous film. The separator 123 may have a structure in which two or more porous films are layered. Specially, a porous film made of polyolefin is preferable, since such a film has superior short circuit preventive effect, and is able to achieve safety improvement of the secondary battery by shutdown effect. In particular, polyethylene is preferable since shutdown effect is able to be thereby obtained at from 100 deg C. to 160 deg C. both inclusive and its electrochemical stability is excellent. Further, polypropylene is also preferable. In addition, a copolymer of polyethylene and polypropylene or a blended material thereof may be used as long as such a resin has chemical stability.

Electrolytic Solution

An electrolytic solution as a liquid electrolyte impregnates the separator 123. The electrolytic solution contains a solvent and an electrolyte salt dissolved therein.

The solvent contains, for example, one or more nonaqueous solvents such as an organic solvent. The solvents (nonaqueous solvents) described below may be used singly or two or more thereof may be used by mixture.

Examples of nonaqueous solvents include ethylene carbonate, propylene carbonate, butylene carbonate, dimethyl carbonate, diethyl carbonate, ethyl methyl carbonate, methyl propyl carbonate, γ-butyrolactone, γ-valerolactone, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, methyl acetate, ethyl acetate, methyl propionate, ethyl propionate, methyl butyrate, methyl isobutyrate, trimethylacetic acid methyl, trimethylacetic acid ethyl, acetonitrile, glutaronitrile, adiponitrile, methoxyacetonitrile, 3-methoxypropionitrile, N,N-dimethylformamide, N-methylpyrrolidinone, N-methyloxazolidinone, N,N'-dimethylimidazolidinone, nitromethane, nitroethane, sulfolane, trimethyl phosphate, and dimethyl sulfoxide. By using such a nonaqueous solvent, a superior battery capacity, superior cycle characteristics, superior storage characteristics and the like are obtained.

Specially, at least one of ethylene carbonate, propylene carbonate, dimethyl carbonate, diethyl carbonate, and ethyl methyl carbonate is preferable. By using such a nonaqueous solvent, a superior battery capacity, superior cycle characteristics, superior storage characteristics and the like are obtained. In this case, a mixture of a high viscosity (high dielectric constant) solvent (for example, specific inductive ∈>30) such as ethylene carbonate and propylene carbonate and a low viscosity solvent (for example, viscosity≤1 mPa·s) such as dimethyl carbonate, ethylmethyl carbonate, and diethyl carbonate is more preferable. Thereby, dissociation characteristics of the electrolyte salt and ion mobility are improved.

In particular, the solvent preferably contains at least one of a halogenated chain ester carbonate and a halogenated cyclic ester carbonate. Thereby, a stable protective film is formed on the surface of the anode 122 at the time of charge and discharge, and thus decomposition reaction of the electrolytic solution is inhibited. The halogenated chain ester carbonate is a chain ester carbonate having halogen as an element. More specifically, at least part of hydrogen in the chain ester carbonate is substituted with halogen. Further, the halogenated cyclic ester carbonate is a cyclic ester carbonate containing halogen as an element. More specifically, at least part of hydrogen in the cyclic ester carbonate is substituted with halogen.

The halogen type is not particularly limited, but specially, fluorine, chlorine, or bromine is preferable, and fluorine is more preferable since thereby higher effect is obtained compared to other halogen. The number of halogen is more preferably two than one, and further may be three or more, since thereby an ability to form a protective film is improved, and a more rigid and more stable protective film is formed. Accordingly, decomposition reaction of the electrolytic solution is further inhibited.

Examples of the halogenated chain ester carbonate include fluoromethyl methyl carbonate, bis(fluoromethyl) carbonate, and difluoromethyl methyl carbonate. Examples of the halogenated cyclic ester carbonate include 4-fluoro-1,3-dioxoane-2-one and 4,5-difluoro-1,3-dioxolane-2-one. Halogenated cyclic ester carbonate includes a geometric isomer as well. Contents of the halogenated chain ester carbonate and the halogenated cyclic ester carbonate in the solvent is, for example, from 0.01 wt % to 50 wt % both inclusive.

Further, the solvent preferably contains an unsaturated carbon bond cyclic ester carbonate. Thereby, a stable protective film is formed on the surface of the anode 42 at the time of charge and discharge, and thus decomposition reaction of the electrolytic solution is inhibited. The unsaturated carbon bond cyclic ester carbonate is a cyclic ester carbonate having an unsaturated carbon bond. More specifically, unsaturated carbon bond is introduced to a certain location of the cyclic ester carbonate. Examples of the unsaturated carbon bond cyclic ester carbonate include vinylene carbonate and vinylethylene carbonate. Contents of the unsaturated carbon bond cyclic ester carbonate in the solvent is, for example, from 0.01 wt % to 10 wt % both inclusive.

Further, the solvent preferably contains sultone (cyclic sulfonic ester), since thereby chemical stability of the electrolytic solution is improved. Examples of the sultone include propane sultone and propene sultone. The sultone content in the solvent is, for example, from 0.5 wt % to 5 wt % both inclusive.

Further, the solvent preferably contains an acid anhydride since chemical stability of the electrolytic solution is thereby improved. Examples of acid anhydrides include carboxylic anhydride, disulfonic anhydride, and carboxylic sulfonic anhydride. Examples of carboxylic anhydrides include succinic anhydride, glutaric anhydride, and maleic anhydride. Examples of disulfonic anhydrides include ethane disulfonic anhydride and propane disulfonic anhydride. Examples of carboxylic sulfonic anhydrides include sulfobenzoic anhydride, sulfopropionic anhydride, and sulfobutyric anhydride. The content of the acid anhydride in the solvent is, for example, from 0.5 wt % to 5 wt % both inclusive.

The electrolyte salt contains, for example, one or more light metal salts such as a lithium salt. The electrolyte salts described below may be used singly or two or more thereof may be used by mixture.

Examples of lithium salts include lithium hexafluorophosphate ($LiPF_6$), lithium tetrafluoroborate ($LiBF_4$), lithium perchlorate ($LiClO_4$), and lithium hexafluoroarsenate ($LiAsF_6$). Further, examples thereof include lithium tetraphenylborate ($LiB(C_6H_5)_4$), lithium methanesulfonate ($LiCH_3SO_3$), lithium trifluoromethane sulfonate ($LiCF_3SO_3$), lithium tetrachloroaluminate ($LiAlCl_4$), dilithium hexafluorosilicate ($Li_2SiF_6$), lithium chloride (LiCl), and lithium bromide (LiBr). In the case of using the foregoing material, superior battery capacity, superior cycle characteristics, superior storage characteristics and the like are obtained.

Specially, at least one of lithium hexafluorophosphate, lithium tetrafluoroborate, lithium perchlorate, and lithium hexafluoroarsenate is preferable. Further, lithium hexafluorophosphate and lithium tetrafluoroborate are more preferable, and lithium hexafluorophosphate is most preferable, since the internal resistance is thereby lowered, more superior effect is obtained.

The content of the electrolyte salt to the solvent is preferably from 0.3 mol/kg to 3.0 mol/kg both inclusive, since thereby high ion conductivity is obtained.

The electrolytic solution may contain various additives together with the solvent and the electrolyte salt, since thereby chemical stability of the electrolytic solution is further improved.

Examples of additives include sultone (cyclic ester sulfonate). Examples of sultone include propane sultone and propene sultone. Specially, propene sultone is preferable. Such sultone may be used singly, or a plurality thereof may be used by mixture.

Examples of additives include an acid anhydride. Examples of acid anhydrides include carboxylic anhydride such as succinic anhydride, glutaric anhydride, and maleic anhydride; disulfonic anhydride such as ethane disulfonic anhydride and propane disulfonic anhydride; and an anhydride of carboxylic acid and sulfonic acid such as sulfobenzoic anhydride, sulfopropionic anhydride, and sulfobutyric anhydride. Specially, sulfobenzoic anhydride or sulfopropionic anhydride is preferable. The anhydrides may be used singly, or a plurality thereof may be used by mixture.

Manufacturing Method of the Secondary Battery

The secondary battery is manufactured, for example, by the following procedure.

First, the cathode 121 is formed. First, a cathode active material, and if necessary, a cathode binder, a cathode electrical conductor or the like are mixed to prepare a cathode mixture, which is dispersed in an organic solvent to form paste cathode mixture slurry. Subsequently, both faces of the cathode current collector 121A are uniformly coated with the cathode mixture slurry, which is dried to form the cathode active material layer 121B. Finally, the cathode active material layer 121B is compression-molded by using a rolling press machine or the like while being heated if necessary. In this case, the resultant may be compression-molded over several times.

Next, the anode 122 is formed by a procedure similar to that of the foregoing anode 10 or the like. In this case, after the anode current collector 122A is prepared, the anode active material layer 122B is formed by sequentially forming the first layer 1 and the second layer 2 on both faces of the anode current collector 122A.

Finally, the secondary battery is assembled by using the cathode 121 and the anode 122. First, the cathode lead 125 is attached to the cathode current collector 121A by welding or the like, and the anode lead 126 is attached to the anode current collector 122A by welding or the like. Subsequently, the cathode 121 and the anode 122 are layered with the separator 123 in between and spirally wound, and thereby the spirally wound electrode body 120 is formed. After that, the center pin 124 is inserted in the center of the spirally wound electrode body. Subsequently, the spirally wound electrode body 120 is sandwiched between the pair of insulating plates 112 and 113, and contained in the battery can 111. In this case, the cathode lead 125 is attached to the safety valve mechanism 115 by welding or the like, and the anode lead 126 is attached to the battery can 111 by welding or the like. Subsequently, the electrolytic solution is injected into the battery can 111 and impregnates the separator 123. Finally, after the battery cover 114, the safety valve mechanism 115, and the PTC device 116 are attached to the open end of the battery can 111, the resultant is caulked with the gasket 117. Thereby, the secondary battery illustrated in FIG. 5 and FIG. 6 is completed.

Operation of the Secondary Battery

In the secondary battery, when charged, for example, lithium ions are extracted from the cathode 121 and inserted in the anode 122 through the electrolytic solution impregnating the separator 123. Meanwhile, when discharged, for example, lithium ions are extracted from the anode 122, and inserted in the cathode 121 through the electrolytic solution impregnating the separator 123.

Effect of the Secondary Battery

According to the first secondary battery, the anode 122 has the structure similar to that of the anode 10 illustrated in FIG. 1. Thus, the cycle characteristics are able to be improved while a high capacity is obtained. Effects of the first secondary battery other than the foregoing effects are similar to those of the foregoing anode 10.

3-2. Second Secondary Battery (Laminated Film Type)

Figure 7:
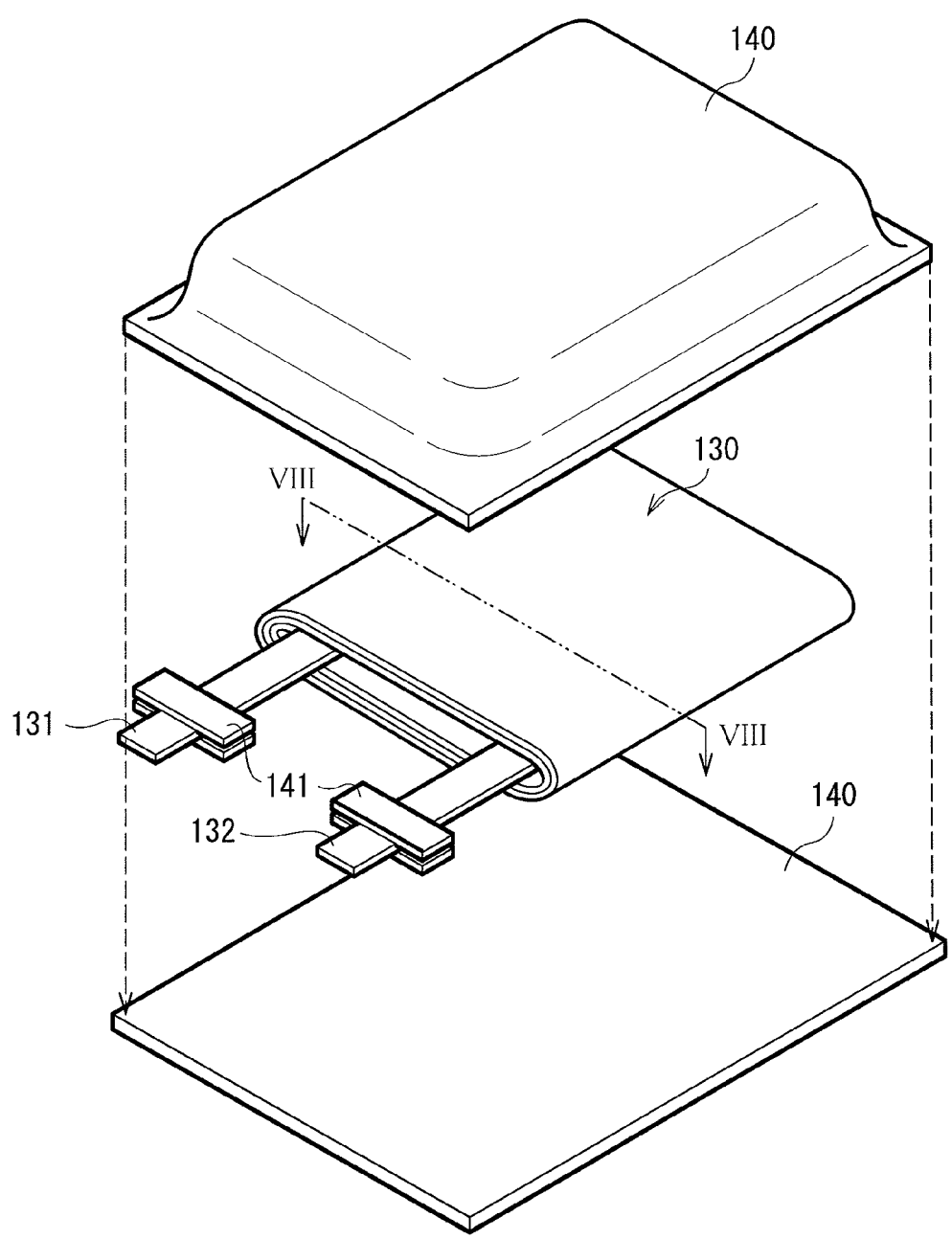
FIG. 7 is an exploded perspective view illustrating a structure of a second secondary battery using the anode for a lithium ion secondary battery of the embodiment.
Figure 8:
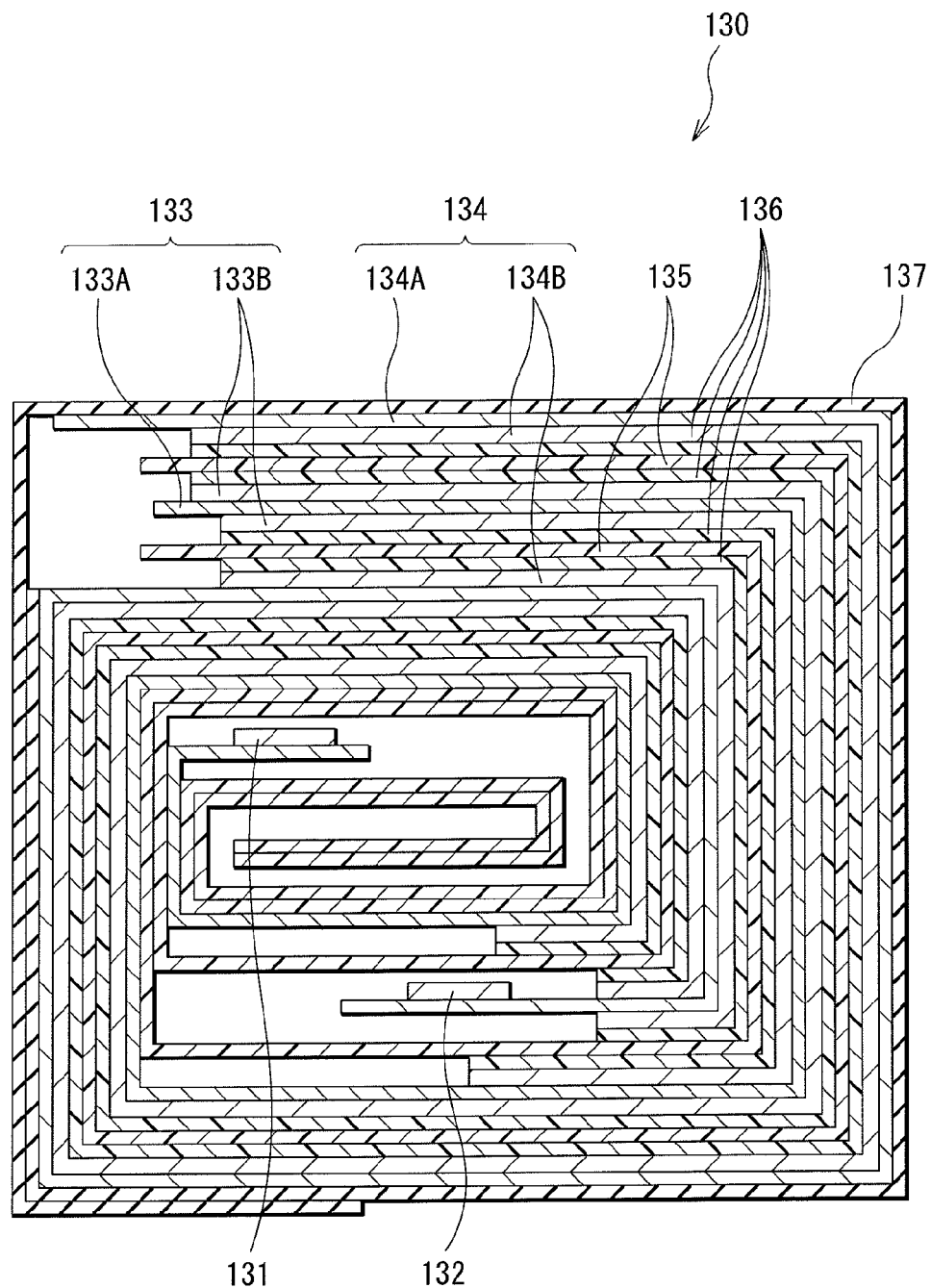
FIG. 8 is a cross sectional view illustrating a structure taken along line VIII-VIII of the spirally wound electrode body illustrated in FIG. 7.

FIG. 7 illustrates an exploded perspective structure of a second secondary battery. FIG. 8 illustrates an exploded cross section taken along line VIII-VIII of a spirally wound electrode body 130 illustrated in FIG. 7.

The secondary battery is, for example, a lithium ion secondary battery like the first secondary battery. In the second secondary battery, a spirally wound electrode body 130 on which a cathode lead 131 and an anode lead 132 are attached is contained in a film package member 140. The battery structure using the package member 140 is so-called laminated film type.

The cathode lead 131 and the anode lead 132 are respectively directed from inside to outside of the package member 140 in the same direction, for example. However, provision positions of the cathode lead 131 and the anode lead 132 to the spirally wound electrode body 130, the derivation direction thereof and the like are not particularly limited. The cathode lead 131 is made of, for example, aluminum or the like, and the anode lead 132 is made of, for example, copper, nickel, stainless or the like. These materials are in the shape of a thin plate or mesh.

The package member 140 is a laminated film in which, for example, a fusion bonding layer, a metal layer, and a surface protective layer are layered in this of two films are bonded to each other by fusion bonding, an adhesive or the like so that the fusion bonding layer and the spirally wound electrode body 130 are opposed to each other. Examples of fusion bonding layers include a film made of polyethylene, polypropylene or the like. Examples of metal layers include an aluminum foil. Examples of surface protective layers include a film made of nylon, polyethylene terephthalate or the like.

Specially, as the package member 140, an aluminum laminated film in which a polyethylene film, an aluminum foil, and a nylon film are layered in this order is preferable. However, the package member 140 may be made of a laminated film having other laminated structure, a polymer film such as polypropylene, or a metal film instead of the foregoing aluminum laminated film.

An adhesive film 141 to protect from entering of outside air is inserted between the package member 140 and the cathode lead 131, the anode lead 132. The adhesive film 141 is made of a material having contact characteristics to the cathode lead 131 and the anode lead 132. Examples of such a material include, for example, a polyolefin resin such as polyethylene, polypropylene, modified polyethylene, and modified polypropylene.

In the spirally wound electrode body 130, as illustrated in FIG. 8, a cathode 133 and an anode 134 are layered with a separator 135 and an electrolyte layer 136 in between and spirally wound. The outermost periphery thereof is protected by a protective tape 137. The cathode 133 has a structure in which, for example, a cathode active material layer 133B is provided on both faces of a cathode current collector 133A. The anode 134 has a structure in which, for example, an anode active material layer 134B is provided on both faces of an anode current collector 134A.

Figure 9:
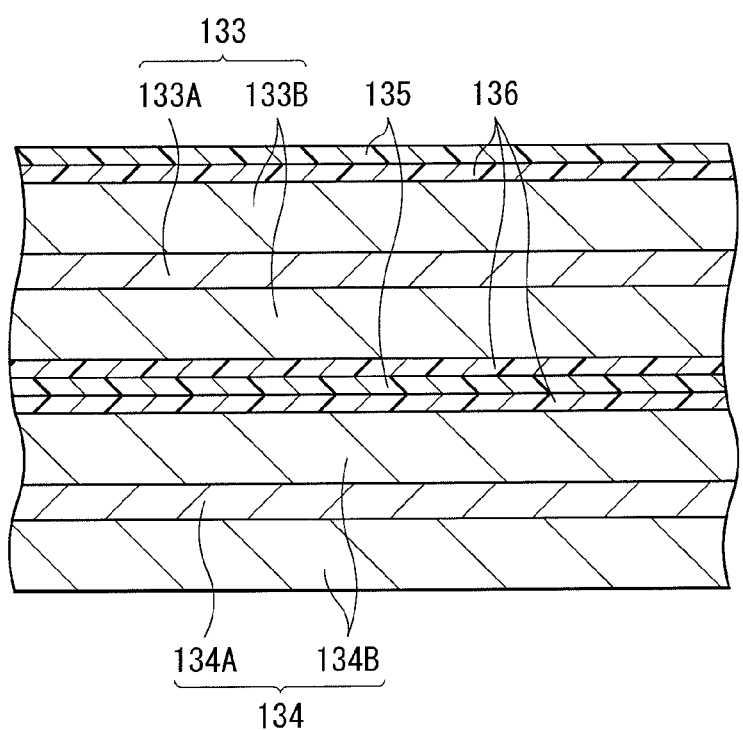
FIG. 9 is a cross sectional view illustrating an enlarged part of the spirally wound electrode body illustrated in FIG. 8.

FIG. 9 illustrates an enlarged part of the spirally wound electrode body 130 illustrated in FIG. 8. The cathode 133 has a structure in which, for example, the cathode active material layer 133B is provided on both faces of the cathode current collector 133A having a pair of faces. The anode 134 has a structure similar to that of the foregoing anode in which, for example, the anode active material layer 134B is provided on both faces of the anode current collector 134A having a pair of faces. The structures of the cathode current collector 133A, the cathode active material layer 133B, the anode current collector 134A, the anode active material layer 134B, and the separator 135 are respectively similar to those of the cathode current collector 121A, the cathode active material layer 121B, the anode current collector 122A, the anode active material layer 122B, and the separator 123 in the foregoing first secondary battery.

In the electrolyte layer 136, an electrolytic solution is held by a polymer compound. The electrolyte layer 136 may contain other material such as various additives according to needs. The electrolyte layer 136 is a so-called gel electrolyte. The gel electrolyte is preferable, since high ion conductivity (for example, 1 mS/cm or more at room temperature) is obtained and liquid leakage of the electrolytic solution is prevented.

Examples of polymer compounds include one or more of the following polymer materials. That is, polyacrylonitrile, polyvinylidene fluoride, polytetrafluoroethylene, polyhexafluoropropylene, polyethylene oxide, polypropylene oxide, polyphosphazene, polysiloxane, and polyvinyl fluoride. Further, examples thereof include polyvinyl acetate, polyvinyl alcohol, polymethacrylic acid methyl, polyacrylic acid, polymethacrylic acid, styrene-butadiene rubber, nitrile-butadiene rubber, polystyrene, and polycarbonate. Further, examples thereof include a copolymer of vinylidene fluoride and hexafluoropropylene. Such a compound may be used singly, or a plurality thereof may be used by mixture. Specially, polyvinylidene fluoride or the copolymer of vinylidene fluoride and hexafluoropropylene is preferable, since such a polymer compound is electrochemically stable.

The composition of the electrolytic solution is similar to the composition of the electrolytic solution in the first secondary battery. However, in the electrolyte layer 136 as the gel electrolyte, a solvent of the electrolytic solution means a wide concept including not only the liquid solvent but also a material having ion conductivity capable of dissociating the electrolyte salt. Therefore, in the case where the polymer compound having ion conductivity is used, the polymer compound is also included in the solvent.

Instead of the gel electrolyte layer 136 in which an electrolytic solution is held by the polymer compound, the electrolytic solution may be directly used. In this case, the electrolytic solution impregnates the separator 135.

The secondary battery including the gel electrolyte layer 136 is manufactured, for example, by the following three procedures.

In the first manufacturing method, first, the cathode 133 and the anode 134 are formed by procedures similar to those of the cathode 121 and the anode 122 in the first secondary battery. Specifically, the cathode 133 is formed by forming the cathode active material layer 133B on both faces of the cathode current collector 133A, and the anode 134 is formed by forming the anode active material layer 134B on both faces of the anode current collector 134A. Subsequently, a precursor solution containing an electrolytic solution, a polymer compound, and a solvent is prepared. After the cathode 133 and the anode 134 are coated with the precursor solution, the solvent is volatilized to form the gel electrolyte layer 136. Subsequently, the cathode lead 131 is attached to the cathode current collector 133A by welding or the like, and the anode lead 132 is attached to the anode current collector 134A by welding or the like. Subsequently, the cathode 133 and the anode 134 provided with the electrolyte layer 136 are layered with the separator 135 in between and spirally wound. After that, the protective tape 137 is adhered to the outermost periphery thereof to form the spirally wound electrode body 130. Finally, after the spirally wound electrode body 130 is sandwiched between 2 pieces of the film package members 140, outer edges of the package members 140 are bonded by thermal fusion bonding or the like to enclose the spirally wound electrode body 130. At this time, the adhesive films 141 are inserted between the cathode lead 131, the anode lead 132 and the package member 140. Thereby, the secondary battery illustrated in FIG. 7 to FIG. 9 is completed.

In the second manufacturing method, first, the cathode lead 131 is attached to the cathode 133, and the anode lead 132 is attached to the anode 134. Subsequently, the cathode 133 and the anode 134 are layered with the separator 135 in between and spirally wound. After that, the protective tape 137 is adhered to the outermost periphery thereof, and thereby a spirally wound body as a precursor of the spirally wound electrode body 130 is formed. Subsequently, after the spirally wound body is sandwiched between 2 pieces of the film package members 140, the outermost peripheries except for one side are bonded by thermal fusion bonding or the like to obtain a pouched state, and the spirally wound body is contained in the pouch-like package member 140. Subsequently, a composition of matter for electrolyte containing an electrolytic solution, a monomer as a raw material for the polymer compound, a polymerization initiator, and if necessary other material such as a polymerization inhibitor is prepared, which is injected into the pouch-like package member 140. After that, the opening of the package member 140 is hermetically sealed by thermal fusion bonding or the like. Finally, the monomer is thermally polymerized to obtain a polymer compound. Thereby, the gel electrolyte layer 136 is formed. Accordingly, the secondary battery is completed.

In the third manufacturing method, the spirally wound body is formed and contained in the pouch-like package member 140 in the same manner as that of the foregoing second manufacturing method, except that the separator 135 with both faces coated with a polymer compound is used firstly. Examples of polymer compounds with which the separator 135 is coated include a polymer containing vinylidene fluoride as a component (a homopolymer, a copolymer, a multicomponent copolymer or the like). Specific examples include polyvinylidene fluoride, a binary copolymer containing vinylidene fluoride and hexafluoropropylene as a component, and a ternary copolymer containing vinylidene fluoride, hexafluoropropylene, and chlorotrifluoroethylene as a component. As a polymer compound, in addition to the foregoing polymer containing vinylidene fluoride as a component, another one or more polymer compounds may be contained. Subsequently, an electrolytic solution is prepared and injected into the package member 140. After that, the opening of the package member 140 is sealed by thermal fusion bonding or the like. Finally, the resultant is heated while a weight is applied to the package member 140, and the separator 135 is contacted with the cathode 133 and the anode 134 with the polymer compound in between. Thereby, the electrolytic solution impregnates the polymer compound, and the polymer compound is gelated to form the electrolyte layer 136. Accordingly, the secondary battery is completed.

In the third manufacturing method, the swollenness of the secondary battery is inhibited compared to the first manufacturing method. Further, in the third manufacturing method, the monomer, the solvent and the like as a raw material of the polymer compound are hardly left in the electrolyte layer 136 compared to the second manufacturing method. Thus, the formation step of the polymer compound is favorably controlled. Therefore, sufficient contact characteristics are obtained between the cathode 133/the anode 134/the separator 135 and the electrolyte layer 136.

In the secondary battery, at the time of charge, for example, lithium ions are extracted from the cathode 133, and are inserted in the anode 134 through the electrolyte layer 136. Meanwhile, at the time of discharge, for example, lithium ions are extracted from the anode 134, and are inserted in the cathode 133 through the electrolyte layer 136.

According to the second secondary battery, the anode 134 has the structure similar to that of the anode 10 illustrated in FIG. 1. Thus, the cycle characteristics are able to be improved while a high capacity is obtained. Other effect of the second secondary battery is similar to that of the foregoing anode 10.

3-3. Third Secondary Battery (Square Type)

Figure 10:
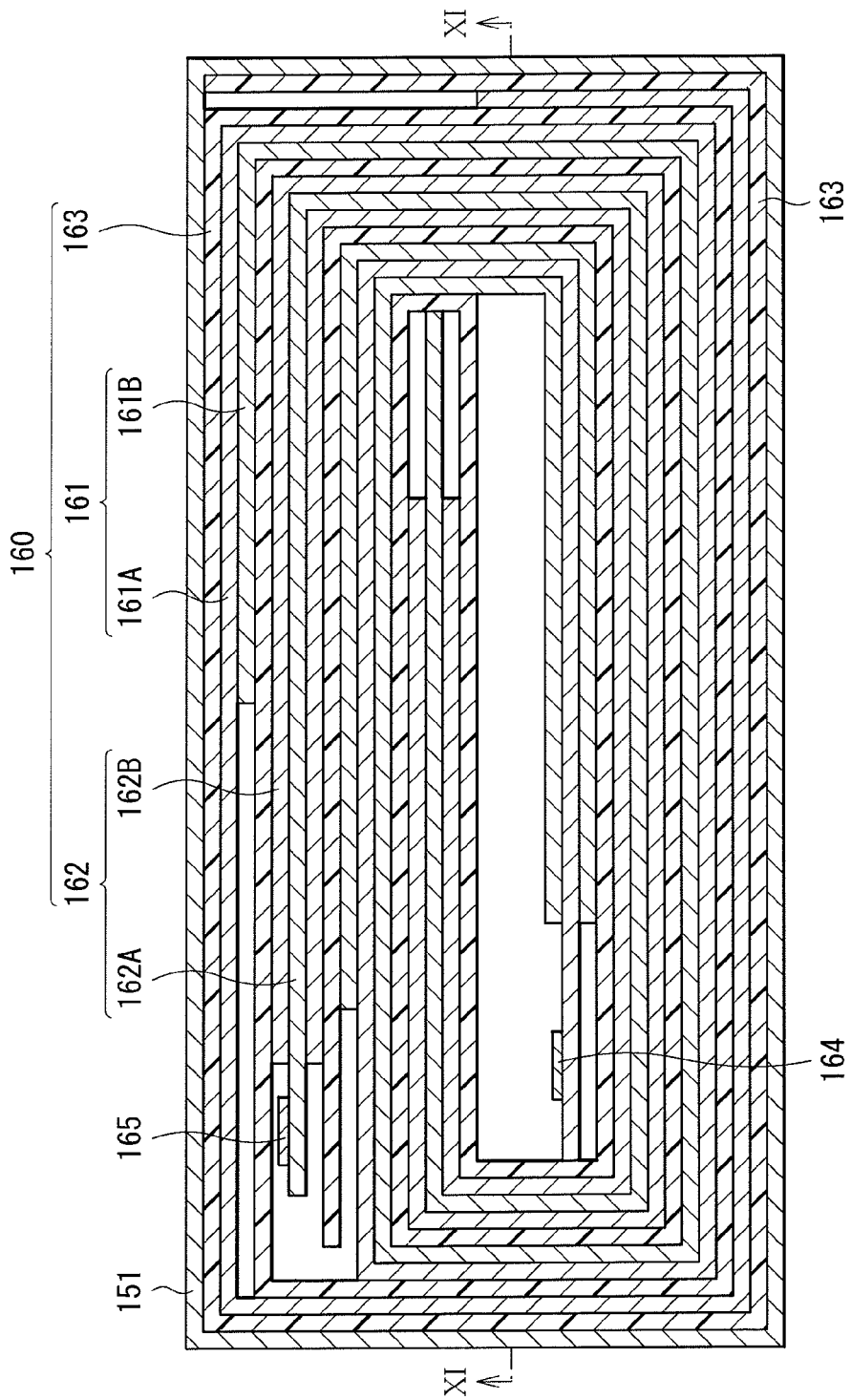
FIG. 10 is a cross sectional view illustrating a structure of a third secondary battery using the anode for a lithium ion secondary battery of the embodiment.
Figure 11:
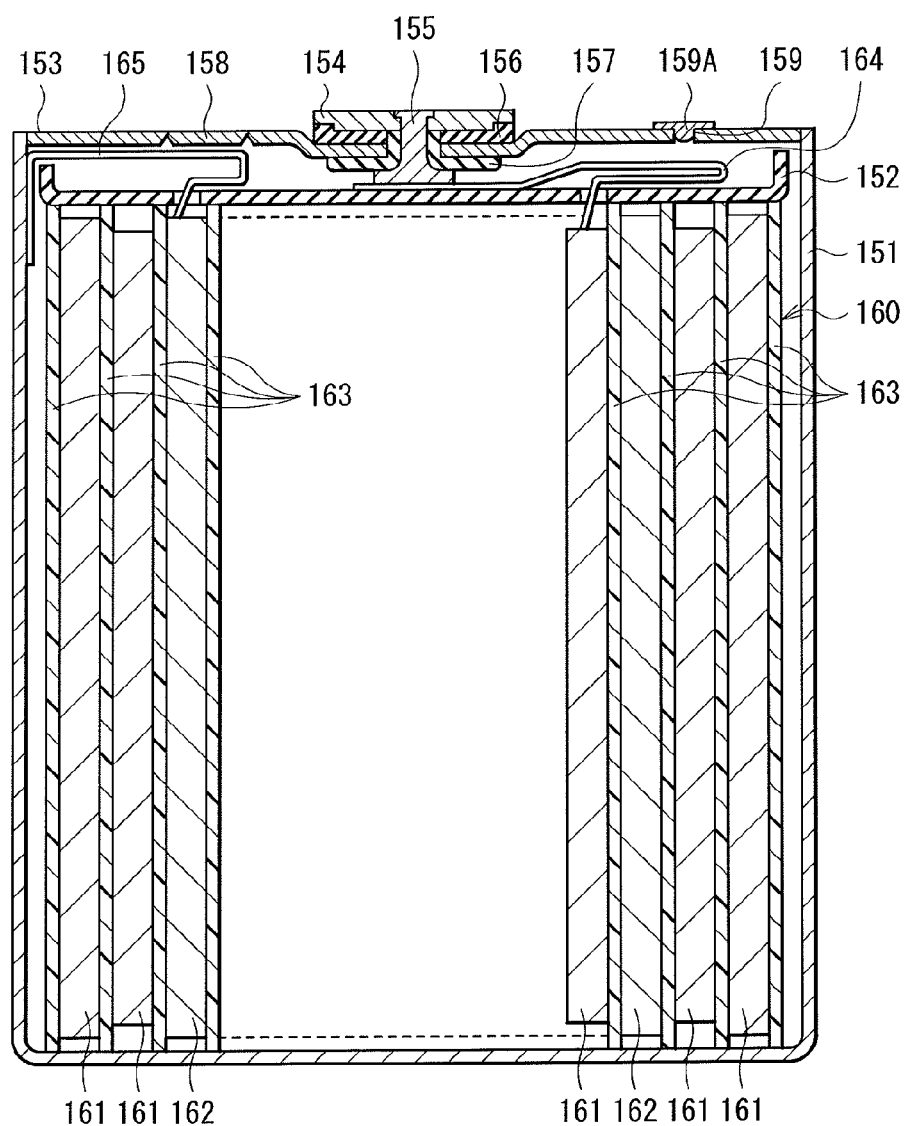
FIG. 11 is a cross sectional view illustrating a structure taken along line XI-XI of the spirally wound electrode body illustrated in FIG. 10.

FIG. 10 and FIG. 11 illustrate a cross sectional structure of a third secondary battery. The cross section illustrated in FIG. 10 and the cross section illustrated in FIG. 11 are perpendicular to each other as the positional relation. That is, FIG. 11 is a cross sectional view taken along line XI-XI illustrated in FIG. 10. The secondary battery is a so-called square type battery and is a lithium ion secondary battery in which a planar spirally wound electrode body 160 is contained in a package can 151 in the shape of an approximate hollow rectangular solid.

The package can 151 is made of, for example, iron (Fe) plated by nickel (Ni). The package can 151 also has a function as an anode terminal. One end of the package can 151 is closed and the other end of the package can 151 is opened. At the open end of the package can 151, an insulating plate 152 and a battery cover 153 are attached, and thereby inside of the battery can 151 is hermetically closed. The insulating plate 152 is made of, for example, polypropylene or the like, and is arranged perpendicular to the spirally wound circumferential face on the spirally wound electrode body 160. The battery cover 153 is, for example, made of a material similar to that of the battery can 151, and also has a function as an anode terminal together with the package can 151. Outside of the battery cover 153, a terminal plate 154 as a cathode terminal is arranged. In the approximate center of the battery cover 153, a through-hole is provided. A cathode pin 155 electrically connected to the terminal plate 154 is inserted in the through-hole. The terminal plate 154 is electrically insulated from the battery cover 153 with an insulating case 156 in between. The cathode pin 155 is electrically insulated from the battery cover 153 with a gasket 157 in between. The insulating case 156 is made of, for example, polybutylene terephthalate. The gasket 157 is made of, for example, an insulating material, and the surface thereof is coated with asphalt.

In the vicinity of the rim of the battery cover 153, a cleavage valve 158 and an electrolytic solution injection hole 159 are provided. The cleavage valve 158 is electrically connected to the battery cover 153. When the internal pressure of the battery becomes a certain level or more by internal short circuit, external heating or the like, the cleavage valve 158 is cleaved to increase internal pressure rise. The electrolytic solution injection hole 159 is sealed by a sealing member 159A made of, for example, a stainless steel ball.

In the spirally wound electrode body 160, a cathode 161 and an anode 162 are layered with a separator 163 in between, and are spirally wound. The spirally wound electrode body 160 is shaped planar according to the shape of the package can 151. The separator 163 is located at the outermost circumference of the spirally wound electrode body 160, and the cathode 161 is located just inside thereof. FIG. 11 is a simplified view of the laminated structure of the cathode 161 and the anode 162. The spirally winding number of the spirally wound electrode body 160 is not limited to the number illustrated in FIG. 10 and FIG. 11, but is able to be arbitrarily set. A cathode lead 164 made of aluminum (Al) or the like is connected to the cathode 161 of the spirally wound electrode body 160. An anode lead 165 made of nickel or the like is connected to the anode 162. The cathode lead 164 is electrically connected to the terminal plate 154 by being welded to the lower end of the cathode pin 155. The anode lead 165 is welded and electrically connected to the package can 151.

As illustrated in FIG. 10, in the cathode 161, a cathode active material layer 161B is provided on a single face or both faces of a cathode current collector 161A. In the anode 162, an anode active material layer 162B is provided on a single face or both faces of an anode current collector 162A. Structures of the cathode current collector 161A, the cathode active material layer 161B, the anode current collector 162A, the anode active material layer 162B, and the separator 163 are respectively similar to the structures of the cathode current collector 121A, the cathode active material layer 121B, the anode current collector 122A, the anode active material layer 122B, and the separator 123 in the first secondary battery described above. An electrolytic solution similar to that of the separator 123 impregnates the separator 163.

The third secondary battery is able to be manufactured, for example, as follows.

As in the foregoing first secondary battery, the cathode 161 and the anode 162 are layered with the separator 163 in between and spirally wound, and thereby the spirally wound electrode body 160 is formed. After that, the spirally wound electrode body 160 is contained in the package can 151. Next, the insulating plate 152 is arranged on the spirally wound electrode body 160. The anode lead 165 is welded to the battery can 151, the cathode lead 164 is welded to the lower end of the cathode pin 155, and the battery cover 153 is fixed on the open end of the battery can 151 by laser welding. Finally, the electrolytic solution is injected into the package can 151 through the electrolytic solution injection hole 159, and impregnates the separator 163. After that, the electrolytic solution injection hole 159 is sealed by the sealing member 159A. The secondary battery illustrated in FIG. 10 and FIG. 11 is thereby completed.

According to the third secondary battery, the anode 162 has the structure similar to that of the anode 10 illustrated in FIG. 1 described above. Thus, the cycle characteristics are able to be improved while a high capacity is obtained. Other effect of the third secondary battery is similar to that of the foregoing anode 10.

4. Application of a Lithium Ion Secondary Battery

Next, a description will be given of an application example of the foregoing lithium ion secondary battery.

Applications of the lithium ion secondary battery are not particularly limited as long as the lithium ion secondary battery is applied to a machine, a device, an instrument, an equipment, a system (collective entity of a plurality of devices and the like) or the like that is able to use the lithium ion secondary battery as a drive power source, an electric power storage source for electric power storage or the like. In the case where the lithium ion secondary battery is used as a power source, the lithium ion secondary battery may be used as a main power source (power source used preferentially), or an auxiliary power source (power source used instead of a main power source or used being switched from the main power source). The main power source type is not limited to the lithium ion secondary battery.

Examples of applications of the lithium ion secondary battery include portable electronic devices such as a video camera, a digital still camera, a mobile phone, a notebook personal computer, a cordless phone, a headphone stereo, a portable radio, a portable television, and a Personal Digital Assistant (PDA); a portable lifestyle device such as an electric shaver; a storage device such as a backup power source and a memory card; an electric power tool such as an electric drill and an electric saw; a medical electronic device such as a pacemaker and a hearing aid; a vehicle such as a battery car (including a hybrid car); and an electric power storage system such as a home battery system for storing electric power for emergency or the like. It is needless to say that application other than the foregoing applications may be adopted.

Specially, the lithium ion secondary battery is effectively applied to the electric power tool, the battery car, the electric power storage system or the like. In these applications, since superior battery characteristics (cycle characteristics, storage characteristics, load characteristics and the like) are demanded, the characteristics are able to be effectively improved by using the lithium ion secondary battery. The electric power tool is a tool in which a moving part (for example, a drill or the like) is moved by using the lithium ion secondary battery as a driving power source. The battery car is a car that acts (runs) by using the lithium ion secondary battery as a driving power source. As described above, a car including the drive source as well other than the lithium ion secondary battery (hybrid car or the like) may be adopted. The electric power storage system is a system using the lithium ion secondary battery as an electric power storage source. For example, in a home electric power storage system, electric power is stored in the lithium ion secondary battery as an electric power storage source, and the electric power is consumed according to needs. In the result, various devices such as home electric products become usable.

EXAMPLES

Specific examples of the embodiments will be described in detail.

Examples 1-1 to 1-10

The square secondary batteries illustrated in FIG. 10 and FIG. 11 were manufactured by the following procedure. The secondary batteries were formed as a lithium ion secondary battery in which the capacity of the anode 162 was expressed based on insertion and extraction of lithium.

First, the cathode 161 was formed. That is, lithium carbonate ($Li_2CO_3$) and cobalt carbonate ($CoCO_3$) were mixed at a molar ratio of 0.5:1. After that, the mixture was fired in the air at 900 deg C. for 5 hours to obtain lithium cobalt composite oxide ($LiCoO_2$). Subsequently, 96 parts by mass of the lithium cobalt composite oxide as a cathode active material, 1 part by mass of graphite as an electrical conductor, and 3 parts by mass of polyvinylidene fluoride as a binder were mixed to obtain a cathode mixture. After that, the cathode mixture was dispersed in N-methyl-2-pyrrolidone to obtain paste cathode mixture slurry. Finally, both faces of the cathode current collector 161A made of a strip-shaped aluminum foil (thickness: 15 μm) were uniformly coated with the cathode mixture slurry, which was dried. After that, the resultant was compression-molded by a roll pressing machine to form the cathode active material layer 161B. After that, the cathode lead 164 made of aluminum was welded and attached to an end of the cathode current collector 161A.

Next, the anode 162 was formed. Specifically, the anode current collector 162A (thickness: 20 μm, ten point height of roughness profile Rz: 4.0 μm) made of an electrolytic copper foil was prepared. After that, an anode active material was deposited several times on both faces of the anode current collector 162A by electron beam evaporation method, and thereby a plurality of anode active material particles in which 10 layers of the first layer 1 and 10 layers of the second layer 2 were alternately layered were formed to obtain the anode active material layer 162B. At this time, while oxygen gas or nitrogen gas was intermittently introduced into an evaporation treatment bath, the anode active material was evaporated on the surface of the anode current collector 162A running at predetermined rate to form the anode active material layer 162B having a thickness of 10 μm. In this case, an evaporation source composed of monocrystal silicon and an evaporation source in which nickel as the metal element X was mixed in silicon were used. Thereby, the first layer 1 contained the insertion layer 3 composed of a silicon oxide, and the second layer 2 contained the insertion layer 3 in which oxygen is bonded to silicon and nickel. The mixture ratio of nickel to silicon in the second layer 2 was 0.1 based on atomic ratio. Further, the mixture ratio of oxygen or nickel contained in the anode active material was changed for every example as illustrated in Table 1 described below. More specifically, the mixture ratio of oxygen or nickel to all silicon contained in the anode active material layer 162B was changed in the range from 0.005 to 0.6 both inclusive. Further, the thickness of the insertion layer 3 was 20 nm. After the anode active material layer 162B was formed, the anode lead 165 made of nickel was welded and attached to one end of the anode current collector 162A.

Subsequently, the separator 163 made of a microporous polyethylene film being 23 μm thick was prepared. The cathode 161, the separator 163, the anode 162, and the separator 163 were layered sequentially to form a laminated body. The resultant laminated body was spirally wound several times, and thereby the spirally wound electrode body 160 was formed. The obtained spirally wound electrode body 160 was shaped into a planar shape.

Next, the planar-shaped spirally wound electrode body 160 was contained in the package can 151. After that, the insulating plate 152 was arranged on the spirally wound electrode body 160. The anode lead 165 was welded to the package can 151, the cathode lead 144 was welded to the lower end of the cathode pin 155, and the battery cover 153 was fixed on the open end of the package can 151 by laser welding. After that, an electrolytic solution was injected into the package can 151 through the electrolytic solution injection hole 159. As the electrolytic solution, an electrolytic solution obtained by dissolving $LiPF_6$ as an electrolyte salt at a concentration of 1 mol/dm$^3$ into a mixed solvent of 50 wt % of ethylene carbonate (EC) and 50 wt % of diethyl carbonate (DEC) was used. Finally, the electrolytic solution injection hole 159 was sealed by the sealing member 159A, and thereby a square type secondary battery was obtained.

Example 1-11

A secondary battery of Example 1-11 was fabricated in the same manner as that of Examples 1-1 to 1-10, except that the insertion layer 3 was not formed both in the first layer 1 and the second layer 2 in forming the anode active material layer 162B by electron beam evaporation method.

For the secondary batteries of the respective examples fabricated as above, the cycle characteristics were examined. In addition, the oxygen/nitrogen existence ratio to silicon in the anode active material layer 162B (O/Si, N/Si) was also examined. The results are illustrated in Table 1.

TABLE 1

Table 1

| | Ni content (Ni/Si) | Element of insertion layer | Oxygen/nitrogen content (O/Si, N/Si) | Discharge capacity retention ratio (%) |
|---|---|---|---|---|
| Example 1-1 | 0.1 | Oxygen | 0.005 | 76 |
| Example 1-2 | 0.1 | Oxygen | 0.01 | 80 |
| Example 1-3 | 0.1 | Oxygen | 0.1 | 83 |
| Example 1-4 | 0.1 | Oxygen | 0.5 | 81 |
| Example 1-5 | 0.1 | Oxygen | 0.6 | 76 |
| Example 1-6 | 0.1 | Nitrogen | 0.005 | 76 |
| Example 1-7 | 0.1 | Nitrogen | 0.01 | 81 |
| Example 1-8 | 0.1 | Nitrogen | 0.1 | 81 |
| Example 1-9 | 0.1 | Nitrogen | 0.5 | 80 |
| Example 1-10 | 0.1 | Nitrogen | 0.6 | 76 |
| Example 1-11 | 0.1 | — | — | 75 |

In examining the cycle characteristics, a cycle test was performed by the following procedure and thereby the discharge capacity retention ratio was obtained. First, to stabilize the battery state, after charge and discharge were performed 1 cycle in the atmosphere at 25 deg C., charge and discharge were performed again to measure the discharge capacity at the second cycle. Subsequently, charge and discharge were performed 98 cycles in the same atmosphere to measure the discharge capacity at the 100th cycle. Finally, the discharge capacity retention ratio (%)=(discharge capacity at the 100th cycle/discharge capacity at the second cycle)*100 was calculated. At this time, for the first cycle, first, constant current charge was performed at the constant current density of 0.3 mA/cm$^2$ until the battery voltage reached 4.25 V, constant voltage charge was continuously performed at the constant voltage of 4.25 V until the current density reached 0.1 mA/cm$^2$, and constant current discharge was performed at the constant current density of 0.1 mA/cm$^2$ until the battery voltage reached 2.5 V. For each one cycle on and after the second cycle, first, constant current charge was performed at the constant current density of 3 mA/cm$^2$ until the battery voltage reached 4.2 V, constant voltage charge was continuously performed at the constant voltage of 4.2 V until the current density reached 0.1 mA/cm$^2$, and constant current discharge was performed at the constant current density of 0.3 mA/cm$^2$ until the battery voltage reached 2.5 V.

Further, the oxygen amount or the nitrogen amount contained in the anode active material layer 162B of the respective examples were respectively measured by the following procedure.

Specifically, measurement was made by using an oxygen and nitrogen analyzer EMGA-620 made by HORIBA, Ltd. Specifically, first, a sample (50 mg or more) taken out from part of the anode active material layer 162B was put into a graphite crucible at high temperature in an extraction furnace retained in vacuum, which was heated and thereby the sample was thermally decomposed. In the result, respective components O, N, and H in the sample were released outside as CO, $N_2$, and $H_2$. Thus, the respective gases of CO, $N_2$, and $H_2$ were transported to a nondispersive infrared detector and a heat conduction detector by carrier gas (He), CO was detected in the nondispersive infrared detector and $N_2$ was detected by the heat conduction detector, and thereby the oxygen/nitrogen content (wt %) was measured. In the nondispersive infrared detector and the heat conduction detector, an AC signal is sent according to the concentration of detected gas (CO and $N_2$). The AC signal is converted to a digital value, and is linearized and is provided with integration process. After the integration, a blank value is corrected and a sample weight is corrected based on a given correction formula. In the result, the oxygen content and the nitrogen content (wt %) are displayed.

Further, the content of silicon contained in the anode active material layer 162B formed in the anode current collector 162A was measured by an inductively coupled plasma emission spectrometry (ICP-AES). From the foregoing measurement result, the contents of silicon, oxygen, and nitrogen contained in the anode active material layer 162B were calculated. The results are also shown in Table 1.

As illustrated in Table 1, in Examples 1-1 to 1-10, the insertion layer 3 was provided, and thus the discharge capacity retention ratio was more improved than in Examples 1-11 in which the insertion layer 3 was not provided. In particular, in the case where the atomic ratio of oxygen to silicon in the insertion layer 3 (O/Si) or the atomic ratio of nitrogen to silicon in the insertion layer 3 (N/Si) was from 0.01 to 0.5 both inclusive (Examples 1-2 to 1-4 and 1-7 to 1-9), a higher discharge capacity retention ratio was obtained.

Examples 2-1 to 2-5

Next, square secondary batteries were fabricated in the same manner as that of Example 1-3, except that the content ratio of nickel to silicon in the second layer 2 was changed. In this case, the atomic ratio of oxygen to silicon in the insertion layer 3 (O/Si) was fixed to 0.1. For Examples 2-1 to 2-5, the cycle characteristics (discharge capacity retention ratio) were examined. The results illustrated in Table 2 were obtained.

TABLE 2

Table 2

| | Ni content (Ni/Si) | Element of insertion layer | Oxygen content (O/Si) | Discharge capacity retention ratio (%) |
|---|---|---|---|---|
| Example 2-1 | 0.006 | Oxygen | 0.1 | 76 |
| Example 2-2 | 0.01 | Oxygen | 0.1 | 80 |
| Example 1-3 | 0.1 | Oxygen | 0.1 | 83 |
| Example 2-3 | 0.5 | Oxygen | 0.1 | 83 |
| Example 2-4 | 1.0 | Oxygen | 0.1 | 81 |
| Example 2-5 | 1.2 | Oxygen | 0.1 | 75 |

It was found that as illustrated in Table 2, in the case where the atomic ratio of nickel to silicon was from 0.01 to 1 both inclusive in the second layer 2 (Examples 1-3 and 2-1 to 2-4), a higher discharge capacity retention ratio was obtained.

Examples 3-1 to 3-8

Next, square secondary batteries were fabricated in the same manner as that of Example 1-3, except that the metal element X as an anode active material contained in the second layer 2 was changed as illustrated in Table 3. In this case, the atomic ratio of the metal element X to silicon in the second layer 2 was 0.1. Further, the atomic ratio of oxygen to silicon in the insertion layer (O/Si) was 0.1.

Examples 3-9 to 3-16

Secondary batteries of Examples 3-9 to 3-16 were fabricated in the same manner as that of Examples 3-1 to 3-8, except that the insertion layer 3 was not formed both in the first layer 1 and the second layer 2 in forming the anode active material layer 162B by electron beam evaporation method.

For Examples 3-1 to 3-16, the cycle characteristics (discharge capacity retention ratio) were examined. The results illustrated in Table 3 were obtained.

TABLE 3

Table 3

| | Metal element X | | Element of insertion layer | Oxygen content (O/Si) | Discharge capacity retention ratio (%) |
|---|---|---|---|---|---|
| | Type | Content (X/Si) | | | |
| Example 3-1 | Co | 0.1 | Oxygen | 0.1 | 83 |
| Example 3-2 | Fe | 0.1 | Oxygen | 0.1 | 82 |
| Example 3-3 | Mn | 0.1 | Oxygen | 0.1 | 81 |
| Example 3-4 | Cr | 0.1 | Oxygen | 0.1 | 82 |
| Example 3-5 | Ti | 0.1 | Oxygen | 0.1 | 81 |
| Example 3-6 | Al | 0.1 | Oxygen | 0.1 | 81 |
| Example 3-7 | Mg | 0.1 | Oxygen | 0.1 | 82 |
| Example 3-8 | Mo | 0.1 | Oxygen | 0.1 | 81 |
| Example 3-9 | Co | 0.1 | — | — | 75 |
| Example 3-10 | Fe | 0.1 | — | — | 74 |
| Example 3-11 | Mn | 0.1 | — | — | 73 |
| Example 3-12 | Cr | 0.1 | — | — | 73 |
| Example 3-13 | Ti | 0.1 | — | — | 72 |
| Example 3-14 | Al | 0.1 | — | — | 72 |
| Example 3-15 | Mg | 0.1 | — | — | 72 |
| Example 3-16 | Mo | 0.1 | — | — | 72 |

It was confirmed that as illustrated in Table 3, in Examples 3-1 to 3-8, since the insertion layer 3 was provided, the discharge capacity retention ratio was largely improved more than in Examples 3-9 to 3-16 in which the insertion layer 3 was not provided. That is, it was confirmed that in the case where cobalt, iron, manganese, chromium, titanium, aluminum, magnesium, and molybdenum were used instead of nickel as the metal element X in the second layer 2, tendency similar to that in the case of using nickel was also shown. Though single type of the metal element X was added in these examples, it was confirmed that similar effect of the insertion layer 3 was obtained as well in the case where the anode active material was formed by using a plurality of metal elements X together with silicon.

Examples 4-1 to 4-7

Next, square secondary batteries were fabricated in the same manner as that of Example 1-3, except that the structure of the second layer 2 and the structure of the insertion layer 3 inserted in the first layer 1 and the second layer 2 were changed as illustrated in Table 4.

Figure 12A:
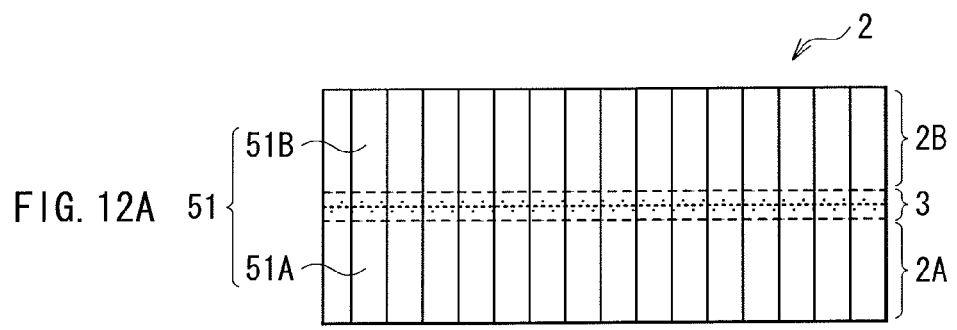
FIGS. 12A, 12B, and 12C are a cross sectional views illustrating a structure of an anode active material layer in secondary batteries as Examples 4-1 to 4-7 of the embodiment.
Figure 12B:
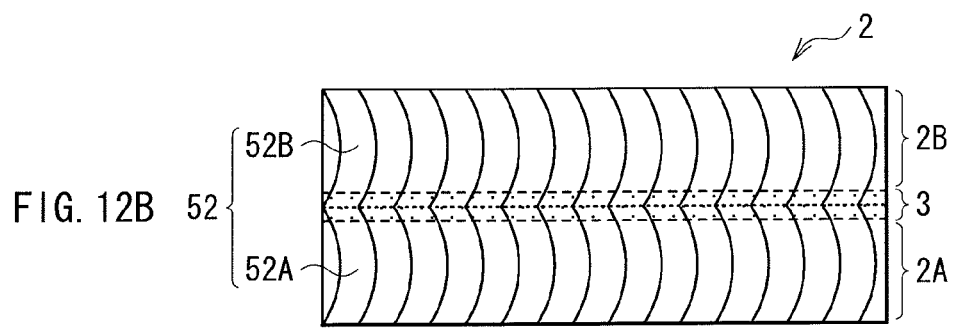
Figure 12C:
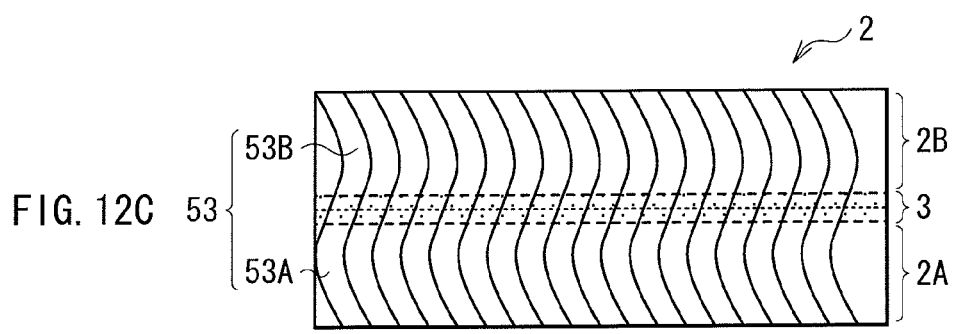

In this case, "straight fiber-like" structure, "curved fiber-like" structure, and "S-shaped fiber-like" structure are all thread-like texture composed of an anode active material observed by an electron microscope such as TEM, in which the aspect ratio (ratio between a diameter and a length) is 1:10 or more, and the maximum value of the diameter is 50 nm or less. In particular, the "straight fiber-like" structure is a structure composed of only a thread-like texture 51 in the shape of a straight lines as illustrated in FIG. 12A. FIG. 12A is a schematic view illustrating an enlarged second layer 2 in the anode active material layer 162B. The thread-like texture 51 in the straight fiber-like structure is a texture in which a straight line section 51A included in the region 2A and a straight line section 51B included in the region 2B are linked in the insertion layer 3. The "curved fiber-like" structure is a structure including a thread-like texture 52 in the shape of a bending curvature in which a pair of curvature sections 52A and 52B curving in the same direction are linked to each other as illustrated in FIG. 12B, for example. The curvature sections 52A and 52B are respectively included in the regions 2A and 2B. Further, the "S-shaped fiber-like" structure is a structure including a thread-like texture 53 in the shape of S in which a pair of curvature sections 53A and 53B curving in the opposite direction are linked to each other as illustrated in FIG. 12C, for example. The curvature sections 53A and 53B are respectively included in the regions 2A and 2B. In all cases, in the anode active material layer 162B, one of a plurality of thread-like textures 51, 52, and 53 is arranged in the in-plane direction.

Figure 13A:
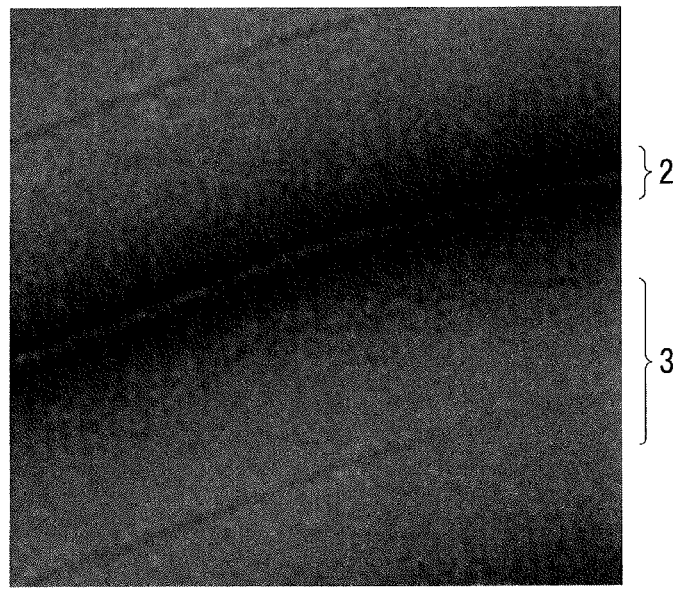
FIGS. 13A and 13B are images obtained by observing a cross section of the anode of the embodiment by an SEM.
Figure 13B:
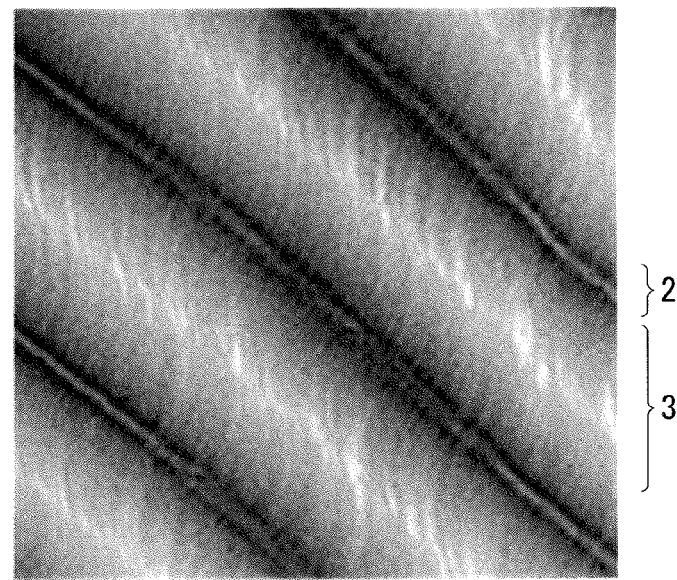

Meanwhile, "bulk-like" structure is a structure in which the anode active material is integrated and the thread-like texture does not exist. FIG. 13A illustrates an example of a cross sectional structure of an anode active material layer in which the second layer 2 having the straight fiber-like structure and the insertion layer 3 having the bulk-like structure exist. Further, FIG. 13B illustrates an example of a cross sectional structure of an anode active material layer in which the second layer 2 having the straight fiber-like structure and the insertion layer 3 having the S-shaped fiber-like structure exist. FIGS. 13A and 13B are an image obtained by observing a cross section of the anode obtained by polishing with the use of a cross section polisher by using a Scanning Electron Microscope (SEM). The atomic ratio of the metal element X to silicon in the second layer 2 was 0.1. Further, the atomic ratio of oxygen to silicon in the insertion layer (O/Si) was 0.1.

For Examples 4-1 to 4-7, the cycle characteristics (discharge capacity retention ratio) were examined. The results illustrated in Table 4 were obtained.

TABLE 4

|  | Second layer | | Insertion layer | | Discharge capacity retention ratio (%) |
| --- | --- | --- | --- | --- | --- |
|  | Ni content (Ni/Si) | Structure | Element | Structure | Oxygen content (O/Si) | |
| Example 1-3 | 0.1 | Bulk state | Oxygen | Bulk state | 0.1 | 83 |
| Example 4-1 | 0.1 | Bulk state | Oxygen | Fiber state | 0.1 | 85 |
| Example 4-2 | 0.1 | Bulk state | Oxygen | Curved fiber state | 0.1 | 87 |
| Example 4-3 | 0.1 | Bulk state | Oxygen | S-shaped fiber state | 0.1 | 88 |
| Example 4-4 | 0.1 | Fiber state | Oxygen | Bulk state | 0.1 | 85 |
| Example 4-5 | 0.1 | Curved fiber state | Oxygen | Bulk state | 0.1 | 86 |
| Example 4-6 | 0.1 | S-shaped fiber state | Oxygen | Bulk state | 0.1 | 87 |
| Example 4-7 | 0.1 | Fiber state | Oxygen | S-shaped fiber state | 0.1 | 89 |

It was confirmed that as illustrated in Table 4, in the case where at least one of the second layer 2 and the insertion layer 3 was in the fiber state, in the curved fiber state, or in the S-shaped fiber state, higher discharge capacity retention ratio was shown than in the case that both the second layer 2 and the insertion layer 3 were in the bulk state. In particular, it was found that the curved fiber state was more preferable than the fiber state, and the S-shaped fiber state was more preferable than the curved fiber state.

Examples 5-1 to 5-6

Next, square secondary batteries were fabricated in the same manner as that of Example 4-7, except that the thickness of the insertion layer 3 and the oxygen content (O/Si) were changed as illustrated in Table 5.

For Examples 5-1 to 5-6, the cycle characteristics (discharge capacity retention ratio) were examined. The results illustrated in Table 5 were obtained.

TABLE 5

Table 5

|  | | Insertion layer | | | Discharge capacity retention ratio (%) |
| --- | --- | --- | --- | --- | --- |
|  | Ni content (Ni/Si) | Element | Thickness (nm) | Oxygen content (O/Si) | |
| Example 4-7 | 0.1 | Oxygen | 20 | 0.1 | 89 |
| Example 5-1 | 0.1 | Oxygen | 1 | 0.3 | 89 |
| Example 5-2 | 0.1 | Oxygen | 2 | 0.3 | 91 |
| Example 5-3 | 0.1 | Oxygen | 20 | 0.3 | 93 |
| Example 5-4 | 0.1 | Oxygen | 50 | 0.3 | 92 |
| Example 5-5 | 0.1 | Oxygen | 100 | 0.3 | 91 |
| Example 5-6 | 0.1 | Oxygen | 150 | 0.3 | 89 |

It was confirmed that as illustrated in Table 5, in the case where the thickness of the insertion layer 3 was from 2 nm to 100 nm both inclusive, particularly preferable discharge capacity retention ratio was obtained.

From the results of the foregoing respective examples, it was found that, structural break of the anode active material layer having a laminated structure was inhibited, and contact characteristics between each layer in the laminated structure were improved, and thus the cycle characteristics thereof were superior.

The description has been given of the case that the anode capacity is expressed based on insertion and extraction of lithium ions. However, the secondary battery is not limited thereto. The embodiments are similarly applicable to a secondary battery in which the anode capacity includes the capacity due to insertion and extraction of lithium ions and the capacity due to precipitation and dissolution of lithium metal, and the anode capacity is expressed by the sum of these capacities. In this case, an anode material capable of inserting and extracting lithium ions is used as an anode active material, and the chargeable capacity of the anode material is set to a smaller value than the discharge capacity of the cathode.

Further, the description has been given of the case in which the battery structure is the cylindrical type, the laminated film type, or the square type, and of the case in which the battery element has the spirally wound structure. However, the battery structure is not limited thereto, but the embodiments are similarly applicable to a case that the battery structure is a coin type or a button type, or a case that the battery element has a laminated structure or the like.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An anode for a lithium ion secondary battery comprising:
    an anode active material layer in which a first layer containing silicon as an anode active material; and
    a second layer containing silicon and a metal element as an anode active material are alternately layered on an anode current collector, wherein
    the first layer and the second layer each include a first region and a second region, the first and second regions separated by an insertion layer comprising at least one of a lamellar oxide-containing region and a lamellar nitrogen-containing region, the at least one of the lamellar oxygen-containing region and the lamellar nitrogen-containing region extending parallel to the anode current collector, and an atomic ratio of oxygen to silicon in the oxygen-containing region or an atomic ratio of nitrogen to silicon in the nitrogen-containing region ranging from 0.01 to 0.5.

2. The anode for a lithium ion secondary battery according to claim 1, wherein the metal element is at least one of nickel, cobalt, iron, manganese, chromium, titanium, aluminum, magnesium, and molybdenum.

3. The anode for a lithium ion secondary battery according to claim 2, wherein in the second layer, an atomic ratio of the metal element to silicon ranges from 0.01 to 1.

4. The anode for a lithium ion secondary battery according to claim 1, wherein the anode active material layer includes a plurality of the first layers and a plurality of the second layers.

5. The anode for a lithium ion secondary battery according to claim 1, wherein the anode active material layer is composed of a plurality of particles, and
    the respective particles have a laminated structure composed of the first layer and the second layer.

6. The anode for a lithium ion secondary battery according to claim 1, wherein the anode active material layer contains a plurality of anode active material fibers composed of the anode active material, and
    the anode active material fibers extend from the first layer to the second layer through at least one of the oxygen-containing region and the nitrogen-containing region, and are in the shape of a straight line, a curve, or an S.

7. A lithium ion secondary battery comprising:
    a cathode;
    an anode; and
    an electrolyte,
    wherein the anode has an anode active material layer in which a first layer containing silicon as an anode active material and a second layer containing silicon and a metal element as an anode active material are alternately layered on an anode current collector, and
    the first layer and the second layer each include a first region and a second region, the first and second regions separated by an insertion layer comprising at least one of a lamellar oxide-containing region and a lamellar nitrogen-containing region, the at least one of the lamellar oxygen-containing region and the lamellar nitrogen-containing region extending parallel to the anode current collector, and an atomic ratio of oxygen to silicon in the oxygen-containing region or an atomic ratio of nitrogen to silicon in the nitrogen-containing region ranging from 0.01 to 0.5.

8. The lithium ion secondary battery according to claim 7, wherein the metal element is at least one of nickel, cobalt, iron, manganese, chromium, titanium, aluminum, magnesium, and molybdenum.

9. The lithium ion secondary battery according to claim 8, wherein in the second layer, an atomic ratio of the metal element to silicon ranges from 0.01 to 1.

10. The lithium ion secondary battery according to claim 7, wherein the anode active material layer includes a plurality of the first layers and a plurality of the second layers.

11. The lithium ion secondary battery according to claim 7, wherein the anode active material layer is composed of a plurality of particles, and
    the respective particles have a laminated structure composed of the first layer and the second layer.

12. An electric tool acting with the use of a lithium ion secondary battery including a cathode, an anode, and an electrolytic solution as a power source, wherein the anode has an anode active material layer in which a first layer containing silicon as an anode active material and a second layer containing silicon and a metal element as an anode active material are alternately layered on an anode current collector, and
    the first layer and the second layer each include a first region and a second region, the first and second regions separated by an insertion layer comprising at least one of a lamellar oxide-containing region and a lamellar nitrogen-containing region, the at least one of the lamellar oxygen-containing region and the lamellar nitrogen-containing region extending parallel to the anode current collector, and an atomic ratio of oxygen to silicon in the oxygen-containing region or an atomic ratio of nitrogen to silicon in the nitrogen-containing region ranging from 0.01 to 0.5.

13. A battery car acting with the use of a lithium ion secondary battery including a cathode, an anode, and an electrolytic solution as a power source,
    wherein the anode has an anode active material layer in which a first layer containing silicon as an anode active material and a second layer containing silicon and a metal element as an anode active material are alternately layered on an anode current collector, and the first layer and the second layer each include a first region and a second region, the first and second regions separated by an insertion layer comprising at least one of a lamellar oxide-containing region and a lamellar nitrogen-containing region, the at least one of the lamellar oxygen-containing region and the lamellar nitrogen-containing region extending parallel to the anode current collector, and an atomic ratio of oxygen to silicon in the oxygen-containing region or an atomic ratio of nitrogen to silicon in the nitrogen-containing region ranging from 0.01 to 0.5.

14. An electric power storage system acting with the use of a lithium ion secondary battery including a cathode, an anode, and an electrolytic solution as an electric power storage source, wherein the anode has an anode active material layer in which a first layer containing silicon as an anode active material and a second layer containing silicon and a metal element as an anode active material are alternately layered on an anode current collector, and the first layer and the second layer each include a first region and a second region, the first and second regions separated by an insertion layer comprising at least one of a lamellar oxide-containing region and a lamellar nitrogen-containing region, the at least one of the lamellar oxygen-containing region and the lamellar nitrogen-containing region extending parallel to the anode current collector, and an atomic ratio of oxygen to silicon in the oxygen-containing region or an atomic ratio of nitrogen to silicon in the nitrogen-containing region ranging from 0.01 to 0.5.

15. The anode for a lithium ion secondary battery according to claim 1, wherein the at least one of the lamellar oxygen-containing region and the lamellar nitrogen-containing region respectively comprises a oxygen content ratio or a nitrogen content ratio that is distributed in a thickness direction of the anode active material layer.

16. The lithium ion secondary battery according to claim 7, wherein the at least one of the lamellar oxygen-containing region and the lamellar nitrogen-containing region respectively comprises a oxygen content ratio or a nitrogen content ratio that is distributed in a thickness direction of the anode active material layer.

* * * * *